(12) United States Patent
Akada et al.

(10) Patent No.: US 6,218,767 B1
(45) Date of Patent: *Apr. 17, 2001

(54) VIBRATION DEVICE

(75) Inventors: Hiroshi Akada; Hiroshi Yamamoto; Tatsuo Chigira; Hironori Takano, all of Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,191

(22) Filed: Dec. 30, 1996

(30) Foreign Application Priority Data

Jan. 8, 1996 (JP) .................................................. 8-000915
Jan. 18, 1996 (JP) .................................................. 8-006776

(51) Int. Cl.[7] .................................................. H01L 41/08
(52) U.S. Cl. .......................................................... 310/323.02
(58) Field of Search ............................... 310/323, 328, 310/366, 365, 348, 354, 345, 323.02, 323.16

(56) References Cited

U.S. PATENT DOCUMENTS

| | | | |
|---|---|---|---|
| 4,504,760 | * 3/1985 | Yamamoto et al. ................. | 310/323 |
| 4,693,580 | 9/1987 | Hanamori .......................... | 354/271.1 |
| 4,720,650 | 1/1988 | Hanamori .......................... | 310/266 |
| 4,857,793 | * 8/1989 | Okuno ................................ | 310/323 |
| 4,959,580 | * 9/1990 | Vishnevsky et al. ................ | 310/323 |
| 5,036,245 | * 7/1991 | Ohnishi et al. ..................... | 310/323 |
| 5,039,899 | 8/1991 | Yamaguchi ........................ | 310/323 |
| 5,066,884 | * 11/1991 | Takagi et al. ....................... | 310/323 |
| 5,101,132 | * 3/1992 | Yamaguchi ........................ | 310/323 |
| 5,105,117 | * 4/1992 | Yamaguchi ........................ | 310/323 |
| 5,136,200 | * 8/1992 | Takizawa et al. .................. | 310/323 |
| 5,247,220 | * 9/1993 | Miyazawa et al. ................. | 310/323 |
| 5,532,540 | * 7/1996 | Claeyssen et al. ................. | 310/323 |
| 5,665,918 | * 9/1997 | Takano et al. ...................... | 310/323 X |

FOREIGN PATENT DOCUMENTS 06-028954   3/1994 (JP) .

* cited by examiner

*Primary Examiner*—Mark O. Budd
(74) *Attorney, Agent, or Firm*—Fitzpatrick, Cella, Harper & Scinto

(57) ABSTRACT

A vibration device has a vibration member for exciting vibration by supplying power to the vibration device. A signal supply member for sandwiching the vibration member such that the vibration member can be elastically deformed supplies a driving electric signal to the vibration member.

21 Claims, 20 Drawing Sheets

FIG. 8
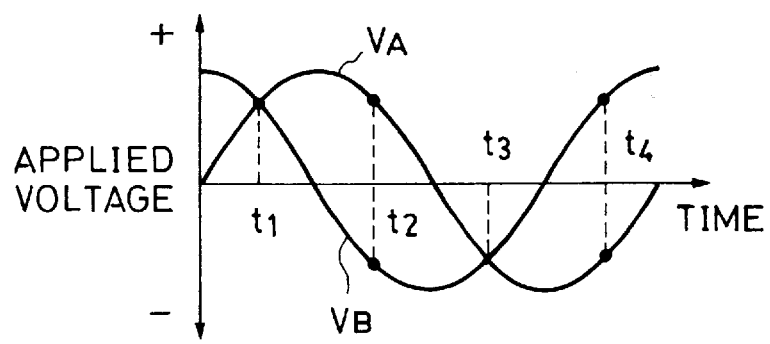
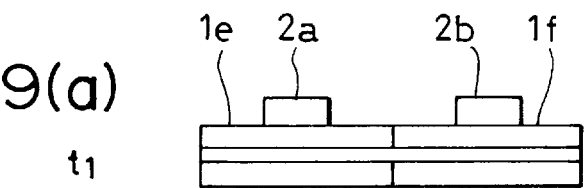
FIG. 9(a) t₁
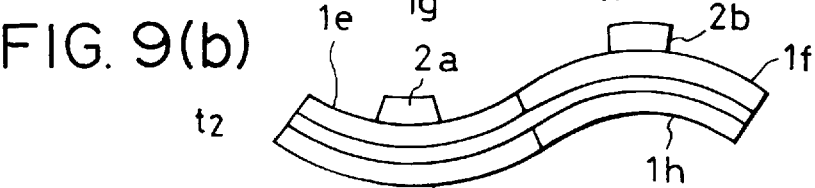
FIG. 9(b) t₂
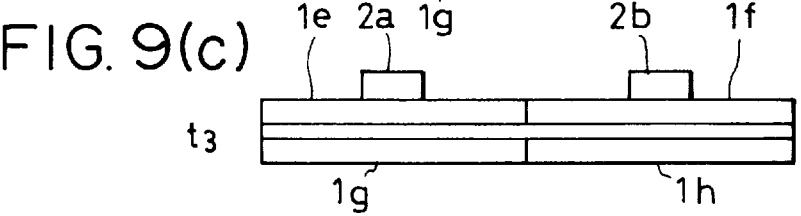
FIG. 9(c) t₃
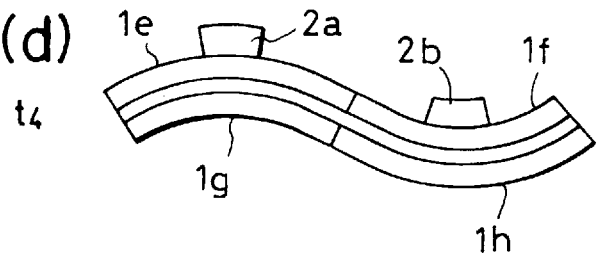
FIG. 9(d) t₄

VIBRATION DEVICE

BACKGROUND OF THE INVENTION

1. Field of the Invention

The present invention relates to a vibration device which uses a vibration of a vibration member to generate vibration force.

2. Description of the Related Art

In a vibration device, power is supplied to a vibration member while the vibration member is in pressure contact with a contact member, to generate vibration force in the vibration member, so that the vibration member and the contact member are relatively moved.

In this case, as a method of connecting a power supply terminal of a conventional vibration member, as disclosed in Japanese Examined Utility Model Publication No. 6-28954, one method is to directly bond a lead line, a flexible printed board, or the like on the vibration member with solder.

However, in the above embodiment, since the vibration m ember directly receives heat from the solder, the piezoelectric characteristics of the vibration member are degraded, and satisfactory driving characteristics of a vibration device cannot be obtained.

In a method of directly bonding a power supply terminal to a vibration member with solder, the power supply terminal may be disconnected from the solder, or the solder may peel together with an electrode layer of the vibration member. As a result, the power supply terminal may not be in contact with the vibration member. In addition, when solder is bonded at a position where vibration displacement occurs, a desired vibration mode may be blocked, and sufficient driving force may not be obtained.

Furthermore, both soldering on the vibration member, and providing leads and connections for the terminal for the vibration member to an external drive circuit are cumbersome operations. For this reason, productivity is considerably degraded.

In some vibration devices using a vibration wave, a vibration member having a rectangular shape is vibrated to linearly vibrate a moving member (contact member) which is in contact with the vibration member. Such a vibration device is arranged as shown in FIG. 27, for example. In FIG. 27, reference numeral 271 denotes an elastic member, and reference numeral 272 denotes a piezoelectric element for exciting a vibration of the elastic member 271. The above vibration member is constituted by the elastic member 271 and the piezoelectric element 272.

Reference numerals 272a, 272b, and 272c denote electrode films for applying a voltage signal having a specific frequency to the piezoelectric element 272. Reference numeral 275 denotes a pressure spring for pressing the mobile member 274 against the elastic member 271 with appropriate force, and reference numeral 277 denotes a bearing for reducing an abrasion resistance between the pressure spring 275 and the mobile member 274.

In the vibration device arranged as described above, when a voltage control circuit applies voltages (indicated by sin and cos in FIG. 27) having specific frequencies and phases which are different by 90° to the electrode films 272a and 272b, the piezoelectric element 272 repeatedly extends and contracts at these frequencies. The extension and contraction of the piezoelectric element 272 excites a longitudinal vibration (e.g., primary mode vibration) and a bending vibration (e.g., quaternary mode vibration) in the elastic member 271. These vibrations synthesize a standing wave for moving the mobile member 274. Due to the synthesized standing wave, material points on the surface of the elastic member 271 elliptically move in the same direction. For this reason, when the mobile member 274 is brought into pressure contact with the elastic member 271, the mobile member 274 is driven by friction between the elastic member 271 and the mobile member 274 in the direction indicated by the arrow in FIG. 27. Movement extraction members 273a and 273b amplify the elliptical movement and transmit it to the mobile member 274 arranged on the elastic member 271.

As unit structures of a driving device operate on the basis of the same principle as described above, for example, a structure proposed in Japanese Unexamined Patent Publication No. 2-228266 (see FIG. 28(b)) and a structure proposed in Japanese Unexamined Patent Publication No. 6-261568 (see FIG. 28(b)) are known. In these unit structures, the vibration member 281 and the contact portion between the mobile member 284 and the vibration member 281 are covered with a case 286.

However, in both cases shown in FIGS. 28(a) and 28(b), since the pressure spring 285 for pressing the mobile member 284 against the vibration member 281 is attached to the inside of the case 286, a space for storing the pressure spring 285 must be formed inside the case 286. For this reason, the case 286 tends to increase in size.

The space can be decreased in size by decreasing an amount of deformation by increasing the spring constant of the pressure spring 285. However, when the spring constant is large, the pressing force greatly changes depending on the amount of deformation of the pressure spring 285, and it is difficult to properly set the pressing force.

Also, a unit in which the pressure spring 285 is stored in the case 286 cannot be easily assembled.

SUMMARY OF THE INVENTION

According to one aspect of the Invention, a power supply member for supplying power to a vibration member is arranged to sandwich the vibration member, so that stable power supply can be performed without soldering.

Other aspects of the Invention will be apparent with reference to the following detailed description of the preferred embodiments.

BRIEF DESCRIPTION OF THE DRAWINGS

FIG. 8 is a waveform chart showing alternating voltage waves applied to the piezoelectric vibration member of the vibration device.

FIGS. 9(a) to 9(d) are views showing the behaviors of the piezoelectric vibration member of the vibration device.

DESCRIPTION OF THE PREFERRED EMBODIMENTS (First Embodiment)

Figure 1:
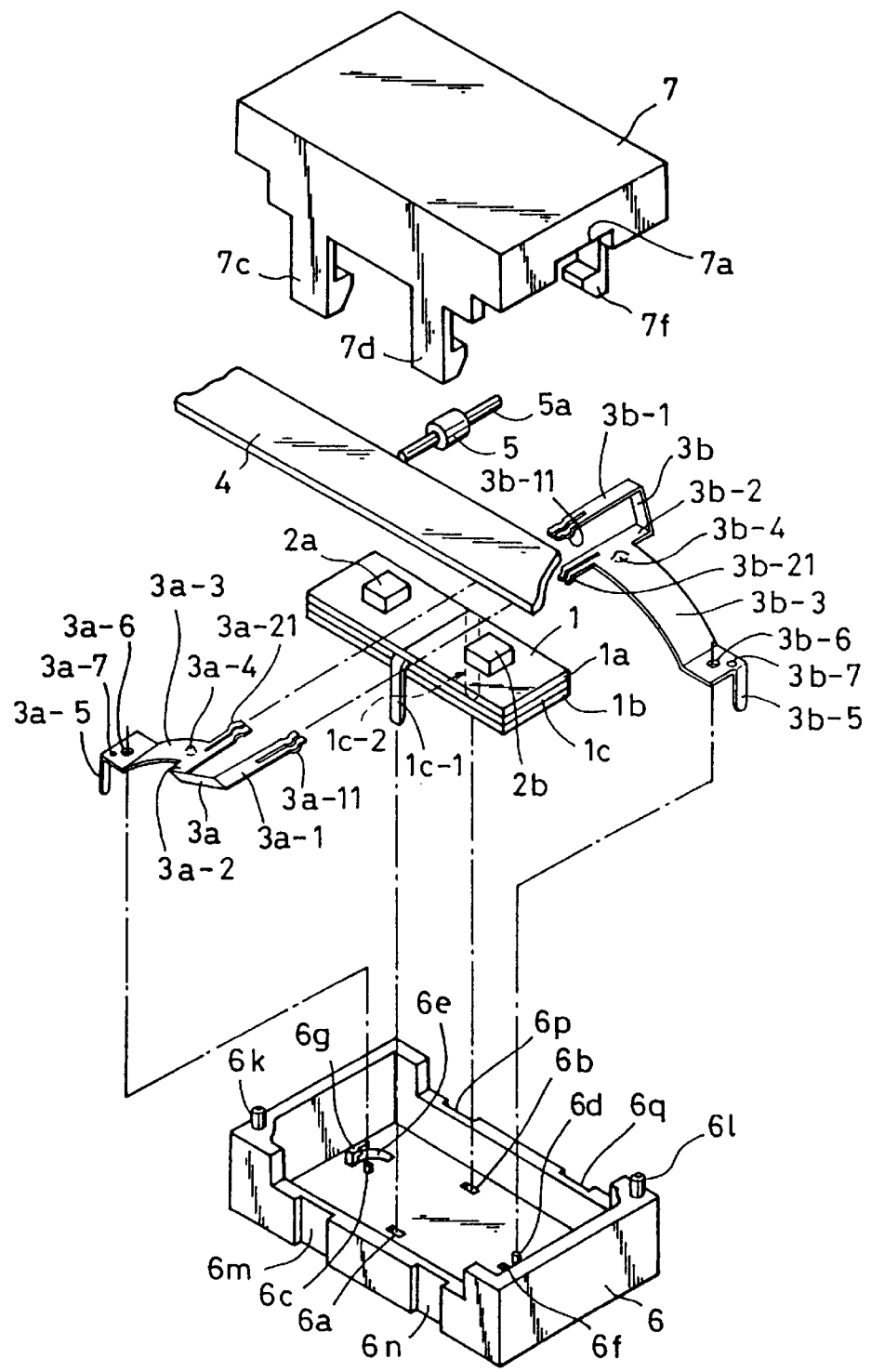
FIG. 1 is an exploded perspective view showing a vibration device according to the first embodiment of the present invention.

The vibration device according to the first embodiment of the present invention will be described below with reference to the accompanying drawings. Referring to FIG. 1, reference numeral 1 denotes a vibration member. The vibration member 1 is formed in such a manner that a pair of plate-like piezoelectric elements 1a and 1b are adhered to opposite surfaces of a plate-like elastic member 1c consisting of phosphor bronze, brass, or the like by pressing.

Figure 2:
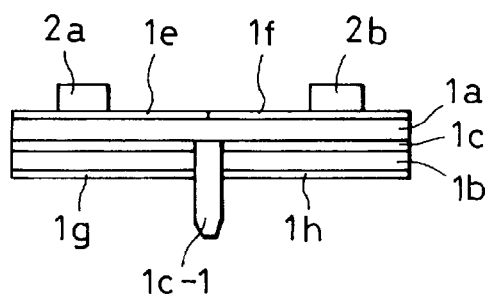
FIG. 2 is a side view showing a piezoelectric vibration member of the vibration device.

A conductive material such as nickel, copper, or the like is deposited on both surfaces of the vibration member 1 to form an electrode layer. The electrode layer, as shown in FIG. 2, is divided near a center line which divides the longitudinal length of the vibration member 1 by two, and the divided portions are insulated from each other. In this manner, a total of four electrode portions 1e to 1h are provided.

Terminal portions 1c-1 and 1c-2 (hidden) which are connected to the ground are arranged on the elastic member 1c, and these terminal portions 1c-1 and 1c-2 are formed such that the terminal portions 1c-1 and 1c-2 are bent and extend downward at a portion which is slightly remote from the root portions of the terminal portions 1c-1 and 1c-2.

The two terminal portions 1c-1 and 1c-2 are opposite to each other in the direction of width of the vibration member 1. The terminal portions 1c-1 and 1c-2 are positioned near the node portion between the longitudinal vibration and the bending vibration of the vibration member 1, so that a vibration mode is avoided from being adversely affected.

A pair of drivers 2a, 2b consisting of a phenol resin, epoxy resin, or the like. The pair of drivers 2a, 2b are attached to the position of a stem of the vibration member to obtain higher driving force.

Reference numerals 3a, 3b denote power supply members consisting of a conductor, such as phosphor bronze, for supplying an electrical signal to the vibration member. Two power supply terminals are used for one vibration member 1. The power supply members 3a and 3b have sandwich terminal portions constituted by first terminal portions 3a-1 and 3b-1 and second terminal portions 3a-2 and 3b-2, respectively. Two contact pieces are formed at the distal ends of the terminal portions to avoid imperfect contact. Contact portions 3a-11, 3a-21, 3b-11, and 3b-21 obtained by embossing are formed at the contact portions between the vibration member 1 and the end portions of the contact pieces.

Pressure spring portions 3a-3 and 3b-3 are formed in the power supply members 3a and 3b, respectively, and projection portions 3a-4 and 3b-4 obtained by embossing are formed near the roots of the pressure spring portions.

Third terminal portions 3a-5 and 3b-5 connected to an external signal transmission member such as a flexible printed board are formed in the power supply members 3a and 3b, respectively. Holes 3a-6, 3a-7, 3b-6, and 3b-7 for positioning the power supply members 3a and 3b relative to a case (to be described later) are formed in the power supply member 3a, 3b.

Reference numeral 4 denotes a guide rail serving as a contact member consisting of stainless steel. Reference numeral 5 denotes a roller. A support shaft 5a is attached to the center of the roller 5 by a known method such as press fitting.

Figure 3:
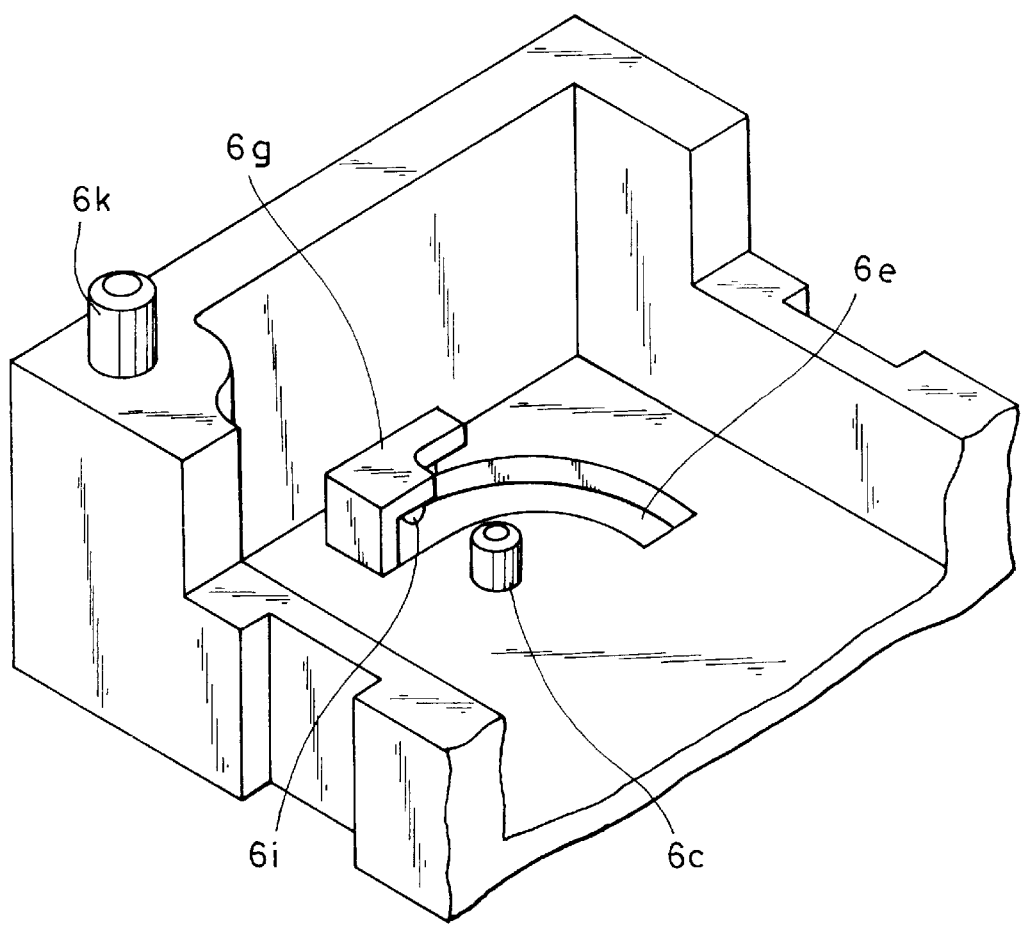
FIG. 3 is a view showing a support structure of a power supply member arranged in the case of the vibration device.

Reference numeral 6 denotes a case processed by plastic molding. The case 6 has holes 6a and 6b through which the terminal portions 1c-i and 1c-2 of the vibration member 1 are inserted; shaft portions 6c and 6d inserted into the holes 3a-6, 3a-7, 3b-6, and 3b-7 of the power supply members 3a and 3b to perform positioning; holes 6e and 6f through which the third terminal portions 3a-5 and 3b-5 of the power supply member 3 are inserted; and stopper portions 6g (FIG. 3) and 6h (hidden from view) for holding the power supply member 3.

Projection portions 6i (FIG. 3) and 6j (hidden from view) are formed on the lower sides of the upper portions of the stopper portions 6g and 6h, respectively. Although the portions 6h and 6j are not shown, the portions 6h and 6j are located at point-symmetric positions of the portions 6g and 6i with respect to the center of the bottom surface.

Groove portions 6m, 6n, 6p, and 6q for smoothly performing snap fitting between the case 6 and a cap 7 (to be described later) and shaft portions 6k and 6l for positioning the cap 7 are formed on the side surface of the case 6.

Figure 5:
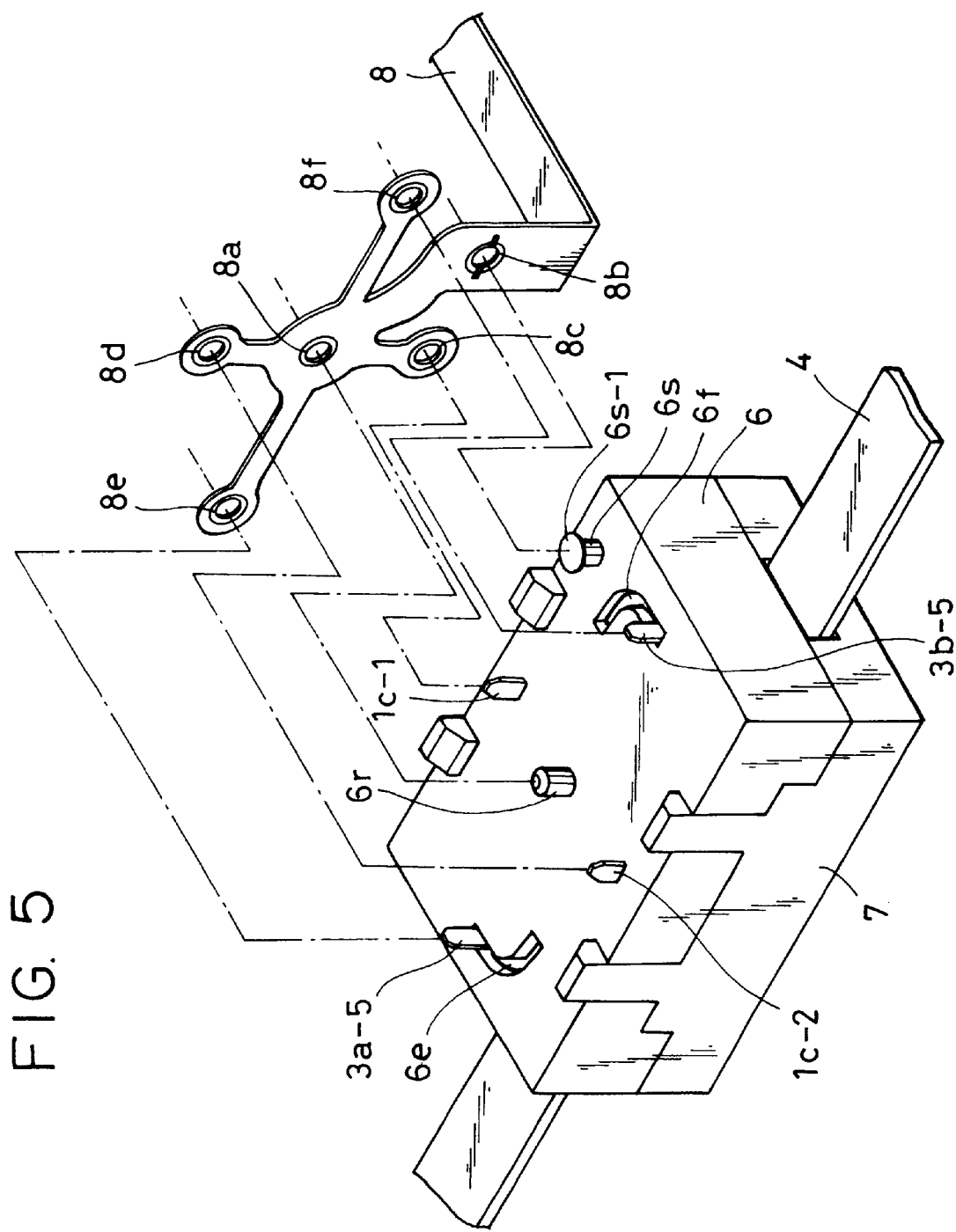
FIG. 5 is a view showing a manner of mounting the vibration device.

On the rear surface of the case 6, as shown in FIG. 5, shaft portions 6r and 6s for positioning a flexible printed board 8 are arranged. A distal end portion 6s-1 of the shaft portion 6s is formed to have a diameter larger than that of the root portion of the shaft portions 6r and 6s.

Reference numeral 7 denotes a cap processed by plastic molding, and groove portions 7a and 7b (the groove portion 7b is not shown) each having a width which is slightly larger than that of the guide rail 4 are formed in the lower portions of both the ends of the cap 7 in the longitudinal direction.

Assembly procedures of the vibration device will be described below. Third terminal portions 3a-5 and 3b-5 of the power supply member 3 are inserted through the holes 6e and 6f of the case 6, respectively. In this case, the third terminal portions 3a-5 and 3b-5 are inserted in such a manner that the holes 6e and 6f are slightly opened outside by using the centers of the holes 3a-6 and 3b-7 of the power supply member 3 as central shafts (holes 6e and 6f are slightly rotated clockwise in FIG. 1). In this state, the holes 3a-6 and 3b-7 are fitted on the shaft portions 6c and 6d, respectively.

In this state, the terminal portions 1c-1 and 1c-2 of the vibration member 1 are inserted into the holes 6a and 6b of the case 6, so that the vibration member 1 is arranged at a predetermined position of the case 6. In this case, the level of the vibration member 1 is adjusted such that the first terminal portions 3a-1 and 3b-1 of the power supply member 3a are arranged above the vibration member 1, and the second terminal portions 3a-2 and 3b-2 are arranged below the vibration member 1, so that the power supply members 3a and 3b are rotated inward (counterclockwise in FIG. 1).

When the power supply members 3a and 3b are gradually rotated inward, the projection portions 6i and 6j arranged on the stopper portions 6g and 6h are brought into contact with the power supply members 3a and 3b. In this manner, the upper portions of the stopper portions 6g and 6h and the power supply members 3a, 3b are slightly deflected.

When the power supply members 3a and 3b are further rotated, the end faces of the power supply members 3a and 3b in the width direction are brought into contact with the end faces of the stopper portions 6g and 6h. At the same time, the projection portions 6i and 6j fall in the holes 3a-7 and 3b-7 of the power supply members 3a and 3b to release the deflection. In this manner, the power supply members 3a and 3b are completely positioned and fixed, and the vibration member 1 is sandwiched by the sandwich terminal portions (the first terminal portions 3a-1 and 3b-1 and the second terminal portions 3a-2 and 3b-2).

Figure 4:
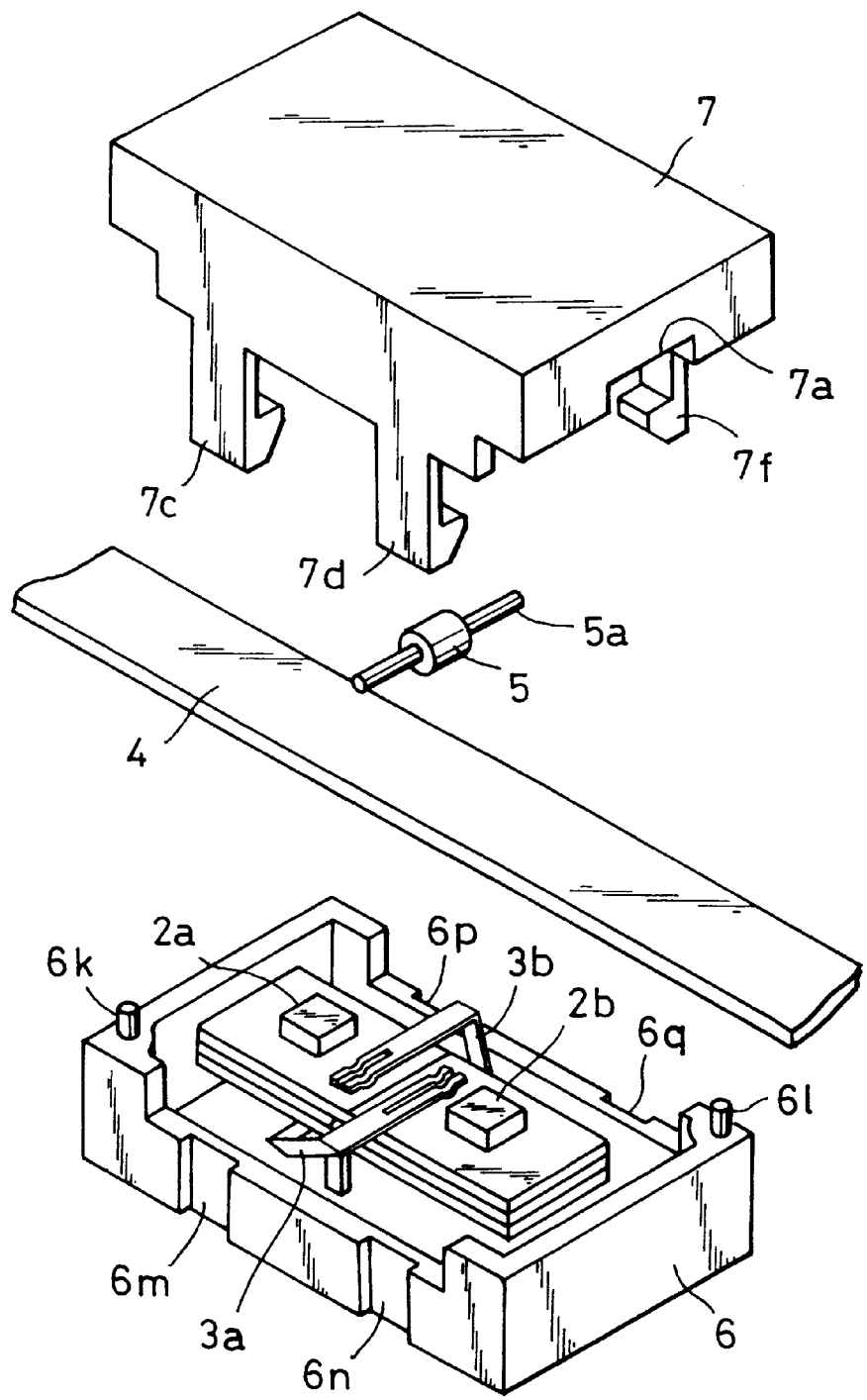
FIG. 4 is a view showing a state wherein the power supply member and the piezoelectric vibration member of the vibration device are incorporated in the case.

The stopper portions 6g and 6h have sizes which are set such that the terminal portions 1c-1 and 1c-2 of the vibration member 1 and the end face of the power supply members 3a and 3b are not in contact with each other, but are separated by small gaps at a position where the power supply members 3a and 3b are brought into contact with the end faces of the stopper portions 6g and 6h, thereby preventing the power supply members 3a and 3b from being brought into contact with each other. FIG. 4 shows a state wherein the vibration member 1 and the power supply members 3a, 3b are incorporated in the case 6.

Contact portions 3a-11, 3a-21, 3b-11, and 3b-21 of the first and second terminal portions 3a-1, 3b-1, 3a-2 and 3b-2 of the power supply members 3a and 3b are in contact with the vibration member 1 with uniform pressing force generated by elasticity of the contact pieces. The positions of the contact points are near a common node position of a longitudinal vibration and a bending vibration, and are symmetrical with respect to the center line of the vibration member 1 in the longitudinal direction. When the contact points are located at these positions, vibration dislocation of the vibration member 1 is not suppressed. For this reason, power supply can be performed without preventing a vibration mode.

The sizes of the first terminal portions 3a-1 and 3b-1 are set such that the levels of the first terminal portions 3a-1 and 3b-1 are always lower than the levels of the drivers 2a and 2b. In this manner, the first terminal portions 3a-1 and 3b-1 are prevented from being in contact with the guide rail 4.

In addition, although the vibration member 1 is brought into contact with the projection portions 3a-4 and 3b-4 of the power supply members 3a and 3b, these positions are near the common node position of the longitudinal vibration and the bending vibration, and are symmetrical with respect to the center line of the vibration member 1 in the longitudinal direction. For this reason, like the first and second terminal portions 3a-1, 3b-1, 3a-2, and 3b-2, vibration dislocation can be suppressed, and the vibration member 1 can be pressed against the guide rail 4 without blocking the vibration mode.

Both ends of the support shaft 5a attached to the roller 5 are fitted on a bearing portion (not shown) arranged on cap 7. Thereafter, the case 6 and the cap 7 are coupled with each other such that the guide rail 4 is received by the groove portions 7a and 7b of the cap 7 and sandwiched by the case 6 and the cap 7. In this case, sandwich pieces 7c, 7d, 7e, and 7f (although the sandwich piece 7e is not shown, it is opposite to the sandwich piece 7c) are guided by groove portions 6m, 6n, 6p, and 6q of the case 6 and engaged with the case 6 by snap fitting. At this time, the shaft portions 6k and 6l of the case 6 are engaged with the holes (not shown) formed in the cap 7, so that the cap 7 is positioned to the case 6.

In this manner, the movement of the guide rail 4 in the width direction is regulated by the inner surfaces of the groove portions 7a and 7b of the cap 7, and the movement of the guide rail 4 in the thickness direction is regulated by the upper surfaces of the groove portions 7a and 7b and the upper surface of the case 6 such that the amount of movement is set to a predetermined amount or less.

When the cap 7 is attached to the case 6, the pressure spring portions 3a-3 and 3b-3 of the power supply members 3a and 3b are slightly deflected, and the contact pressure between the drivers 2a, 2b and the guide rail 4 required to drive the vibration device can be supplied.

Since the pressure spring portions 3a-3 and 3b-3 cause the projection portions 3a-4 and 3b-4 to press the vibration member 1, the pressure is not loaded on the contact portions 3a-21 and 3b-21 arranged near the projection portions 3a-4 and 3b-4 not to twist the contact portions 3a-21 and 3b-21, and contact pressures of the contact portions 3a-21 and 3b-21 can be kept constant. The sizes of the pressure spring portions 3a-3 and 3b-3 are set to satisfy the following conditions. That is, even if the pressure spring portions 3a-3 and 3b-3 are deflected by a predetermined amount, the positions of the contact portions 3a-11, 3a-21, 3b-11, and 3b-21 of the power supply member 3 and the press points of the projection portions 3a-4 and 3b-4 are near the common node position of the longitudinal vibration and the bending vibration, and are kept symmetrical with respect to the center line of the vibration member 1 in the longitudinal direction.

FIG. 5 is a view showing the vibration device of this embodiment when viewed from the rear surface of the vibration device. Referring to FIG. 5, reference numeral 8 denotes a flexible printed board. The flexible printed board 8 is connected to an external drive circuit (not shown). Terminal holes 8c, 8d, 8e, and 8f, through which the terminal portions 1c-1 and 1c-2 of the vibration member 1 and the third terminal portions 3a-5 and 3b-5 of the power supply member 3 are inserted, are formed in the flexible printed board 8. Holes 8a and 8b for positioning the flexible printed board 8 relative to the case 6 are also formed in the flexible printed board 8.

In order to connect the flexible printed board 8 to the vibration device, the shaft portion 6s of the case 6 is inserted into the hole 8b. Since cut portions are formed in the hole 8b, the shaft portion 6s can be deeply inserted into the hole 8b such that the distal end portion 6s-1 of the shaft portion 6s having a large diameter can be easily inserted over the hole 8b.

The shaft portion 6r of the case 6 is inserted through the hole 8a. In this manner, the flexible printed board 8 is positioned relative to the case 6.

Finally, the terminal portions 1c-1 and 1c-2 of the vibration member 1 and the third terminal portions 3a-5 and 3b-5 of the power supply members 3a and 3b are inserted through the terminal holes 8c, 8d, 8e, and 8f and soldered, respectively. When the terminals are united on the same plane as described above, a soldering operation can be easily performed, and productivity is considerably improved. Since soldering can be performed at a position spaced apart from the vibration member 1, the piezoelectric characteristics of the vibration member 1 can be prevented from being degraded by heat from the solder, and preferable driving characteristics can be obtained.

Figure 6A:
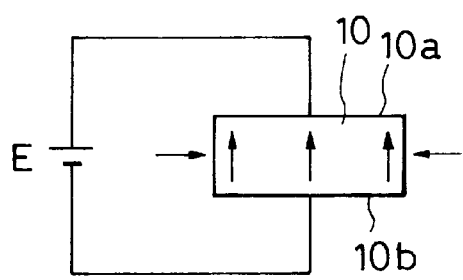
FIGS. 6(a) and 6(b) are views for explaining a piezoelectric effect in the vibration device.
Figure 6B:
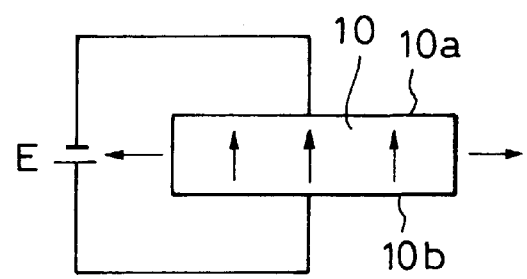

A driving principle of the vibration device will be described below. FIGS. 6(a) and 6(b) are views showing the piezoelectric effect of a piezoelectric element. Referring to FIGS. 6(a) and 6(b), reference numeral 10 denotes a piezoelectric element which is subjected to a polarization process upward in FIGS. 6(a) and 6(b) (direction indicated by arrows in FIGS. 6(a) and 6(b). Electrodes 10a and 10b are formed on both surfaces of the piezoelectric element by deposition processing.

FIG. 6(a) is a view showing a manner in which a positive potential and a negative potentials are applied to the electrodes 10a and 10b, respectively. In this case, since an electric field is formed having a direction from the electrode 10a to the electrode 10b, i.e., the reverse direction of the polarization direction, the piezoelectric element 10 contracts in the direction perpendicular to the polarization direction, and the amount of contraction depends on the magnitude of the electric field generated.

FIG. 6(b) is a view showing a manner in which a negative potential and a positive potentials are applied to the electrodes 10a and 10b, respectively. In this case, since an electric field is formed having a direction from the electrode 10b to the electrode 10a, i.e., the same direction as the polarization direction, the piezoelectric element 10 extends (expands) in the direction perpendicular to the polarization direction, and the amount of extension (expansion) depends on the magnitude of the electric field generated.

The vibration member of the vibration device uses these piezoelectric phenomena to excite a standing wave such that the drivers 2a and 2b elliptically move.

Figure 7:
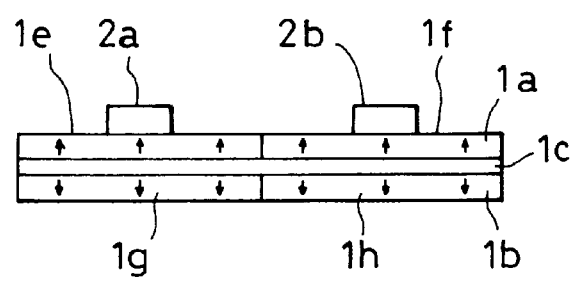
FIG. 7 is a side view showing a piezoelectric vibration member of the vibration device.

FIG. 7 is a side view showing the vibration member of the vibration device (the terminals 1c-1 and 1c-2 are omitted).

The piezoelectric element 1a is subjected to polarization processing upward in FIG. 7, and the piezoelectric element 1b is subjected to polarization processing downward in FIG. 7. The elastic member 1c is connected to ground potential.

In the vibration member 1 arranged as described above, as shown in FIG. 8, when an alternating voltage $V_A$ having the same phase and the same amplitude is applied to the electrode portions 1e and 1h, and an alternating voltage $V_B$ having the same phase and the same amplitude is applied to the electrode portions 1f and 1g (the voltages $V_A$ and $V_B$ have different phases, respectively), the vibration member 1 performs various behaviors by in accordance with the piezoelectric effect described above.

For example, the vibration member 1 at time $t_1$ in FIG. 8 contracts in the longitudinal direction as shown in FIG. 9(a) because a positive voltage having the same value is applied to the electrode portions 1e and 1h. The vibration member 1 at time $t_2$ in FIG. 8 is bent in an S-shaped form as shown in FIG. 9(b) because a positive voltage is applied to the electrode portions 1e and 1h, and a negative voltage having the same absolute value as that of the voltage applied to the electrode portions 1e and 1h is applied to the electrode portions 1f and 1g.

The vibration member 1 at time $t_3$ in FIG. 8 extends in the longitudinal direction as shown in FIG. 9(c) because a negative voltage having the same value is applied to the electrode portions 1e and 1h. The vibration member 1 at time $t_4$ in FIG. 8 is bent in an S-shaped form (reverse to the S-shaped form at time $t_2$) as shown in FIG. 9(d) because a negative voltage is applied to the electrode portions 1e and 1h, and a positive voltage having the same absolute value as that of the voltage applied to the electrode portions 1e and 1h is applied to the electrode portions 1f and 1g.

As described above, when the behaviors are observed at continuous time, the vibration member 1 performs a behavior obtained by synthesizing extension/contraction movement (longitudinal vibration) and bending movement (lateral vibration), and the drivers 2a and 2b draw elliptic orbits. The rotating directions of the elliptic orbits of the drivers 2a and 2b coincide with each other. When the phases of the alternating voltages $V_A$ and $V_B$ are reversed to each other, the rotating direction of the elliptic orbit is reverse to the rotating direction described above.

When the drivers 2a and 2b which elliptically move are brought into pressure contact with the guide rail 4, driving force is generated between the drivers 2a and 2b and the guide rail 4. The case 6, the cap 7, the vibration member 1 or the like stored therein, and the guide rail 4 relatively move. More specifically, when the guide rail 4 is fixed, the vibration member 1 moves; and when the vibration member 1 is fixed, the guide rail 4 moves.

(Second Embodiment)

In the first embodiment, the power supply members 3a, 3b are temporarily fixed to the case 6 first, the vibration member 1 is set in the case 6, and the power supply members 3a, 3b are pivoted, thereby performing normal mounting. However, an embodiment in which operation efficiency is more improved to improve productivity will be described below. The same reference numerals as in the first embodiment denote the same members in the second embodiment, and a description thereof will be omitted.

Figure 10:
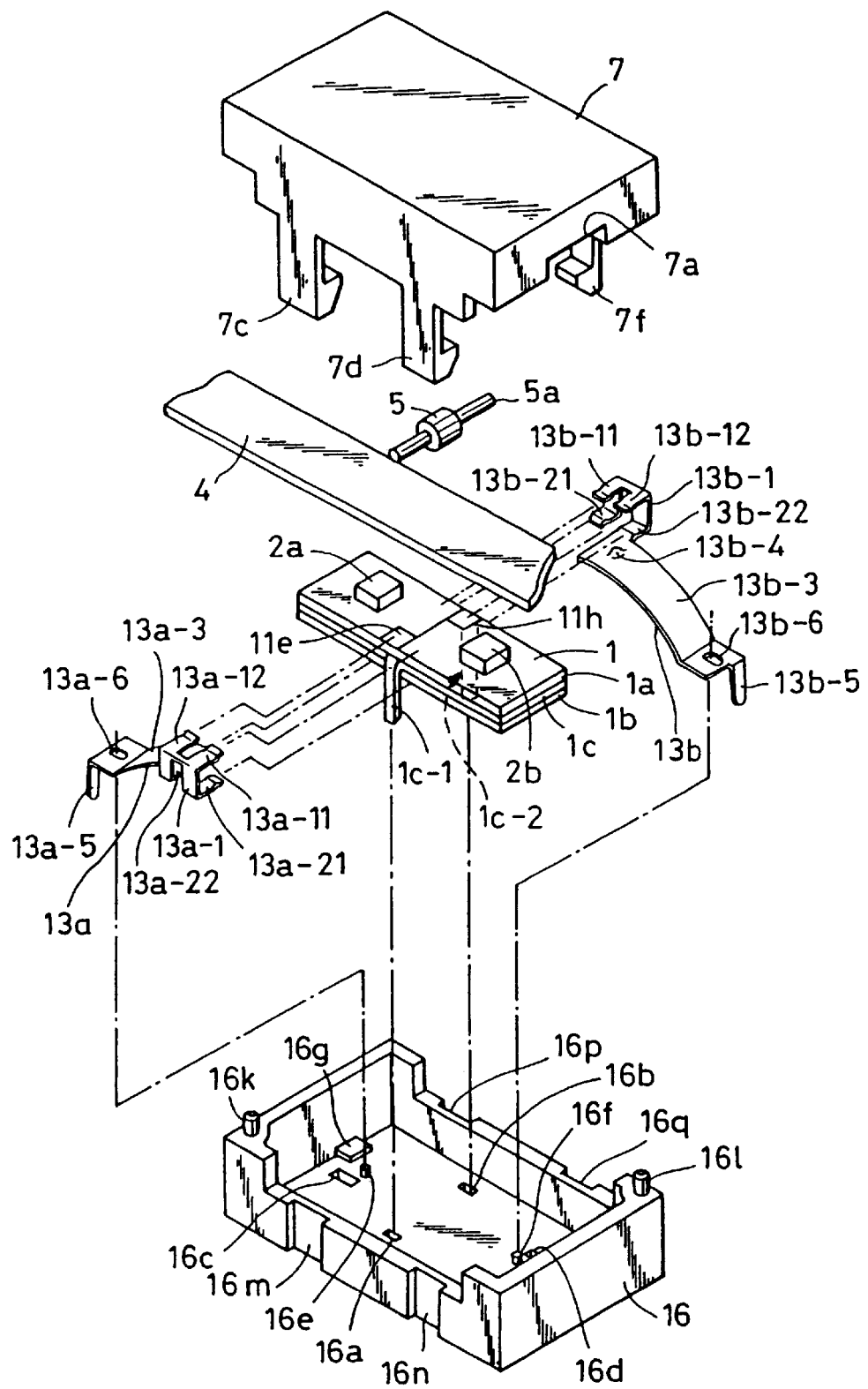
FIG. 10 is an exploded perspective view showing a vibration device according to the second embodiment of the present invention.

Referring to FIG. 10, sandwich terminal portions 13a-1 and 13b-1 are arranged on power supply members 13a and 13b, respectively. Two contact pieces 13a-11 and 13a-12 and two contact pieces 13b-11 and 13b-12 are formed on the upper sides of the sandwich terminal portions 13a-1 and 13*b*-1, respectively, and two contact pieces 13*a*-21 and 13*a*-22 and two contact pieces 13*b*-21 and 13*b*-22 are formed on the lower sides of the sandwich terminal portions 13*a*-1 and 13*b*-1, respectively.

These contact pieces have elasticity and projection portions serving as contact points near their distal ends. For this reason, the vibration member 1 is sandwiched between the sandwich terminal portions 13*a*-1 and 13*b*-1, and these projection portions are brought into pressure contact with each other near a common node position of the longitudinal vibration and bending vibration of the vibration member 1 and positions which are symmetrical with respect to the center line of the vibration member 1 in the longitudinal direction, so that the power supply members 13*a* and 13*b* can be incorporated in the vibration member 1.

The electrode layer of the vibration member 1 is partially insulated not to be in contact with the contact pieces 13*a*-12, 13*a*-21, 13*b*-12, and 13*b*-21 (11*e* and 11*h*).

Thereafter, the power supply members 13*a* and 13*b* with the vibration member 1 are attached at a predetermined position of a case 16 in the following manner. That is, the terminal portions 1*c*-1 and 1*c*-2 (hidden) of the vibration member 1 are inserted into holes 16*a* and 16*b*, terminals 13*a*-5 and 13*b*-5 to be connected to an external power supply member are inserted into holes 16*c* and 16*d* formed in the case 16. The long holes 13*a*-6 and 13*b*-6 formed in the power supply members 13*a* and 13*b* are fitted on shaft portions 16*e* and 16*f* arranged on the case 16.

In this case, the end faces of the power supply members 13*a* and 13*b* are slidably inserted into stopper portions 16*g* and 16*h* (although the stopper portion 16*h* is not shown, it is opposite to the stopper portion 16*g*) arranged on the case 16 while the power supply member 13 is slightly deflected inward.

When the power supply members 13*a*, 13*b* are incorporated in the vibration member 1, and both of them are set in the case 16, operation efficiency can be improved, and productivity can also be improved.

According to the present invention, the above embodiment, the modification, and technical elements thereof may be combined with each other as needed.

As has been described above, the above embodiment employs an arrangement in which the power supply members can be electrically connected to the piezoelectric element such that the power supply members sandwich the vibration member. For this reason, since the power supply members need not be directly soldered to the power supply region of the vibration member, a conventional problem, i.e., imperfect contact occurring by degradation of the characteristics of the electromechanical energy conversion caused by solder, can be solved, and the original performance of the vibration device can be obtained (maintained).

When a portion of the vibration member near the node portion of vibration of the vibration member is sandwiched between power supply members, or positions which are symmetrical with respect to the central portion of the vibration member are sandwiched by a plurality of power supply members, vibration of the vibration member can be prevented from being blocked by the presence of the power supply members. When the power supply members are formed such that a plurality of contact pieces are in contact with one piezoelectric element (power supply region), the piezoelectric element (power supply region) can be brought into contact with the power supply members more reliably.

Furthermore, the external connection terminals of the vibration member and the power supply members extend in the same direction so as to be simultaneously exposed on the bottom surface of the case. For this reason, connection of the external circuit to these external connection terminals can be efficiently performed, and productivity can be improved. In addition, heat from soldering for connection to the external circuit is prevented from being easily transmitted to the vibration member, so that the characteristics of the vibration member can be prevented from being adversely affected.

A pressing portion for supplying pressing force between the vibration member and the contact member to the power supply member. For this reason, the number of parts or the number of assembly steps can be reduced compared with a case wherein a pressing portion is arranged independently of a power supply member. In this case, when the pressing portion is brought into contact with the position near the node portion of vibration of the vibration member, or the pressing portions of a plurality of power supply members are brought into contact with positions which are symmetrical with respect to the central portion of the vibration member, vibration of the vibration member can be prevented from being blocked.

Some of a plurality of contact pieces of the sandwich connection portions are brought into contact with the piezoelectric element in an insulating state to serve as sandwich pieces for sandwiching the vibration member. For this reason, power supply polarity to the piezoelectric element can be freely selected while the vibration member is reliably sandwiched.

Furthermore, a support portion for supporting a power supply member which is not in contact with the external connection terminal of the vibration member is arranged in the case member. For this reason, preferable power supply to the piezoelectric element through the power supply member can be assured.

In this case, a mobile holding means for movably holding the power supply member between a position (sandwich position) where the sandwich connection portions sandwich the vibration member and a position (release position) which is released from the vibration member, and a lock means for locking and holding the power supply member at the sandwich position. In this manner, the power supply member and the vibration member can be easily attached on the case member.

(Third Embodiment)

Figure 11:
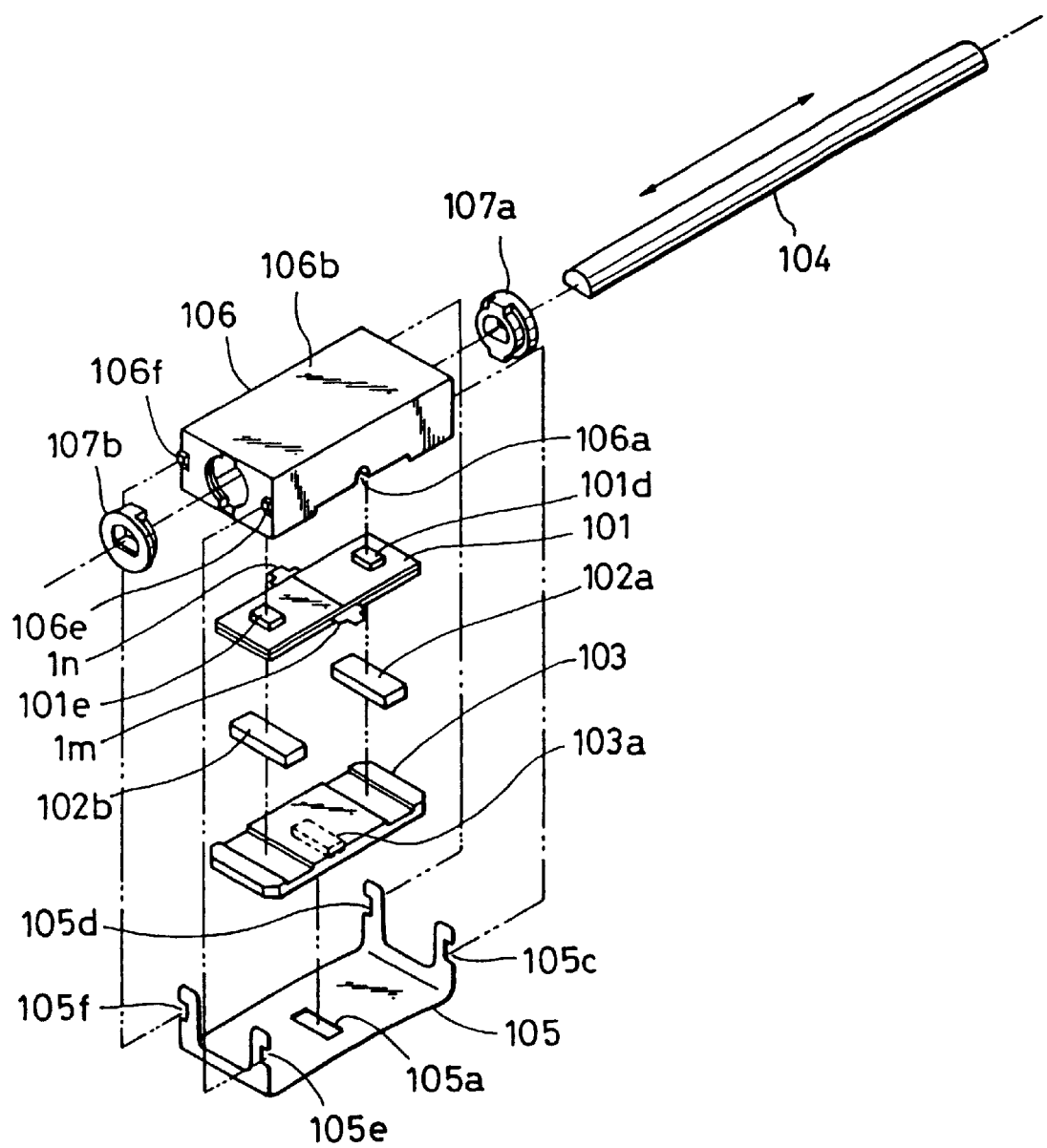
FIG. 11 is an exploded perspective view showing a vibration wave motor according to the third embodiment of the present invention.
Figure 12:
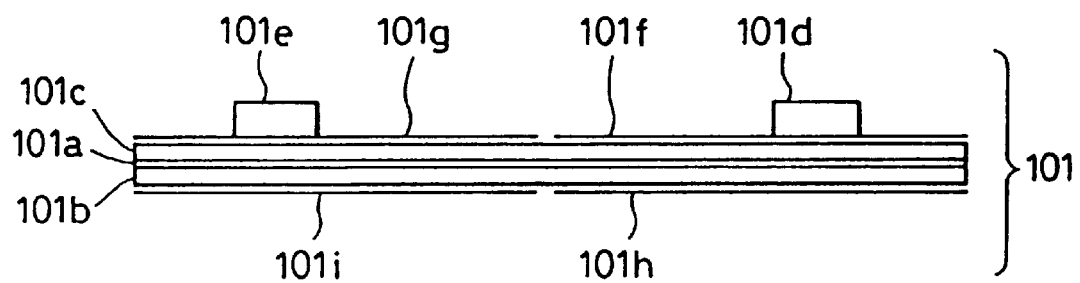
FIG. 12 is a sectional view showing a vibration member of the vibration wave motor in FIG. 11.

A vibration wave motor (vibration device) according to the third embodiment will be described below. FIG. 11 is an exploded perspective view showing the vibration wave motor. Referring to FIG. 11, reference numeral 101 denotes a vibration member serving as a driving source of a vibration wave motor. This vibration member 101, as shown in FIG. 12 in detail, is constituted by an elastic member 101*a* having an almost rectangular shape and consisting of brass, phosphor bronze, or stainless steel, piezoelectric elements 101*b* and 101*c* adhered to the upper and lower surfaces of the elastic member 101*a*, movement extraction members 101*d* and 101*e* adhered to the upper surface of the piezoelectric element 101*c*, and electrode films 101*f*, 10*g*, 101*h*, and 101*i* formed and divided at the center of the piezoelectric elements 101*b* and 101*c* in the longitudinal directions to have predetermined widths.

Reference numerals 102*a* and 102*b* in FIG. 11 denote elastic members such as felt. The elastic members 102*a* and 102*b* are arranged at a position opposing the movement extraction members (drivers) 101*d* and 101*e* arranged on the vibration member 1. Reference numeral 103 denotes a support member for supporting the vibration member 101 through the elastic members 102a and 102b. The support member 103 is fixed on the lower surfaces of the elastic members 102a and 102b with an adhesive agent, a pressure sensitive adhesive double coated tape, or the like. In this embodiment, the two elastic members 102a and 102b are provided. However, if the elastic members are located at a position almost opposing the movement extraction members 101d and 101e, one or three or more elastic members may be arranged.

Reference numeral 104 denotes a mobile member which is brought into contact with the movement extraction members 101d and 101e to convert elliptic movement generated by the movement extraction members 101d and 101e into linear movement. The lower surface of the mobile member 104 has a D-shaped section whose lower surface is flat.

Reference numeral 105 denotes a pressure spring for bringing the movement extraction members 101d and 101e of the vibration member 101 into contact with each other by pressing force, and reference numeral 106 denotes a case for storing the vibration member 101. An opening portion having an opening area which can be fitted on the support member 103 such that the support member 103 can be vertically moved.

Figure 14:
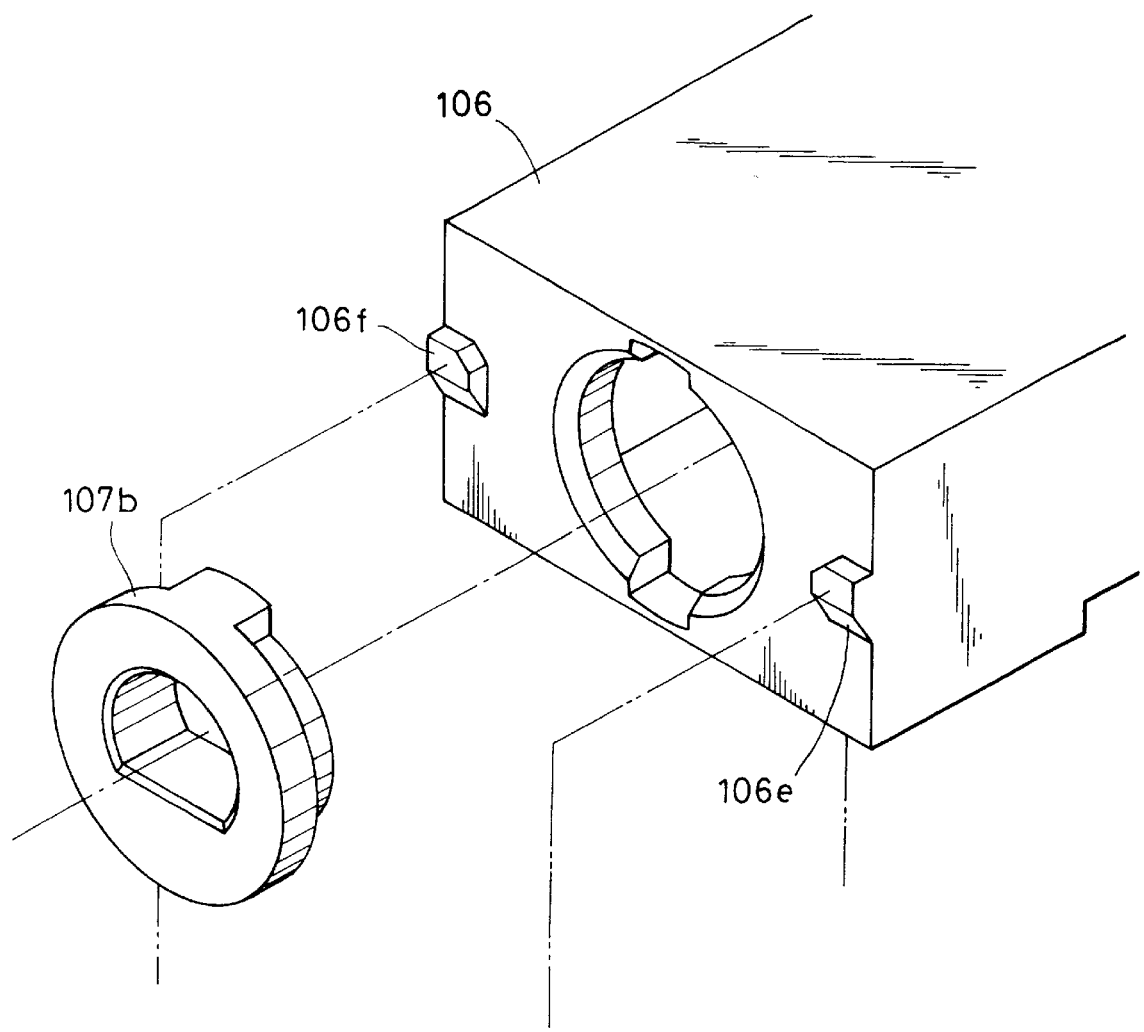
FIG. 14 is an enlarged view showing the case and guide member of the vibration wave motor.

Reference numerals 107a and 107b denote guide members for guiding the mobile member 104 in the moving direction and around the shaft in the moving direction. The guide members 107a and 107b preferably consist of a resin, a metal, or the like which is excellent in abrasion resistance and slidability. As shown in FIG. 14, in order to prevent the two guide members 107a and 107b from being shifted relative to each other, projection portions formed on the guide members 107a and 107b are fitted in the recessed portions of the case 106. In this embodiment, although the guide members 107a and 107b are formed independently of the case 106, the guide members 107a and 107b can be integrated with the case 106 as a matter of course.

Figure 13:
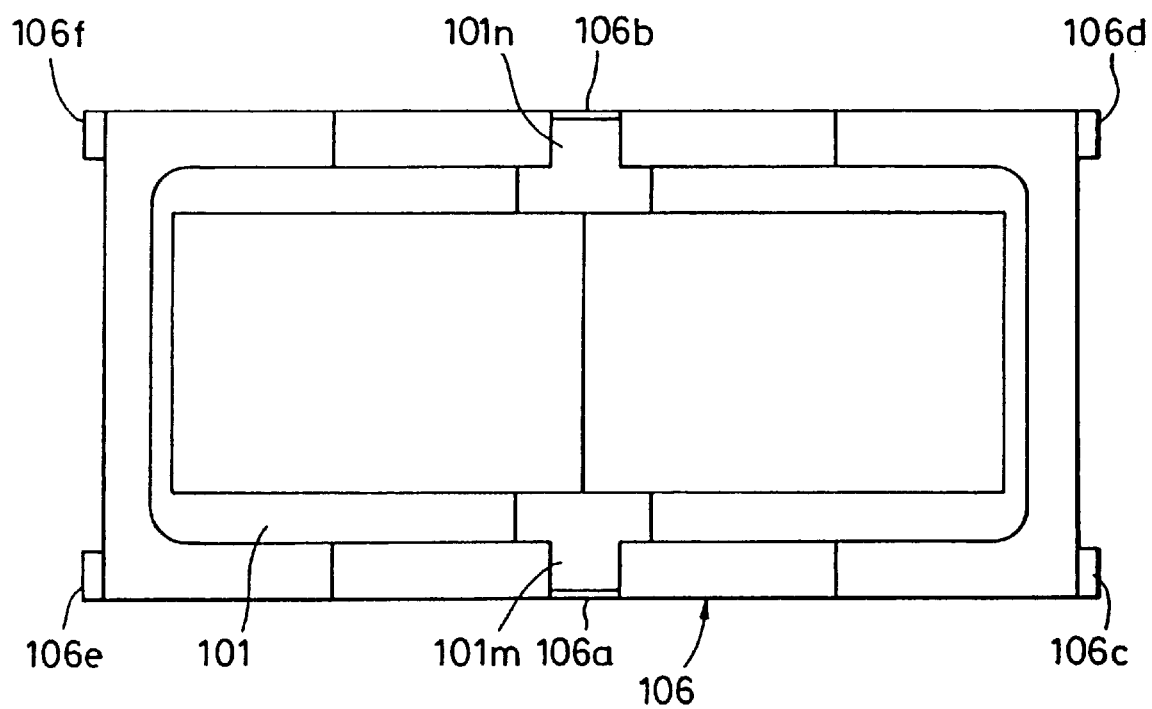
FIG. 13 is a bottom view showing a support state of the vibration member.

As shown in FIG. 13, two guide support portions 106a and 106b for the vibration member 101 are arranged on the side surfaces of the case 106, and the guide support portions 106a and 106b are fitted on two projection portions 101m and 101n arranged on opposite sides of the elastic member 101a of the vibration member 101 in the width direction to guide the vibration member 101 in the direction of the level of the case 106. The support member 103 has a projection portion 103a. The projection portion 103a is fitted in a hole 105a formed at the center of the pressure spring 105 in the longitudinal direction, so that the support member 103 is positioned relative to the pressure spring 105. A voltage applying flexible printed board (to be described later) and a voltage applying circuit are omitted in FIG. 11.

A method of supporting a pressure spring by the above arrangement will be described below. The pressure spring 105 has engagement arms which are separately extending upward and arranged at both ends of the pressure spring 105 in the longitudinal direction, and the upper portions of these engagement arms are cut into recessed shapes to form engagement portions 105c, 105d, 105e, and 105f. Engagement projections 106c, 106d, 106e, and 106f each having a projection shape are formed at positions corresponding to the engagement portions 105c to 105f in the case 106.

Figure 15:
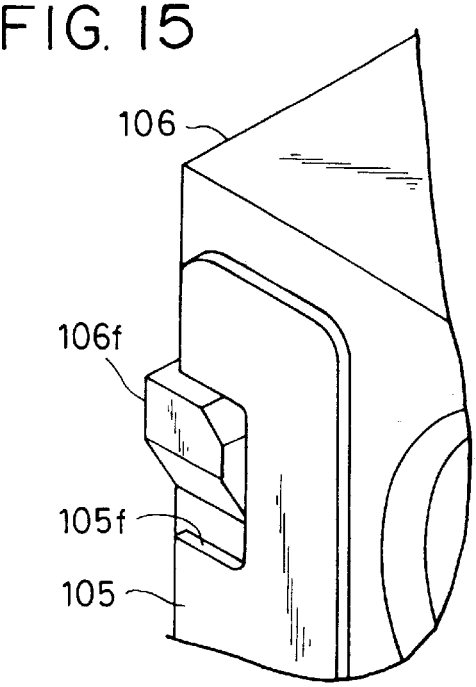
FIG. 15 is an enlarged view showing an engagement state between the case and a pressure spring of the vibration wave motor.
Figure 16:
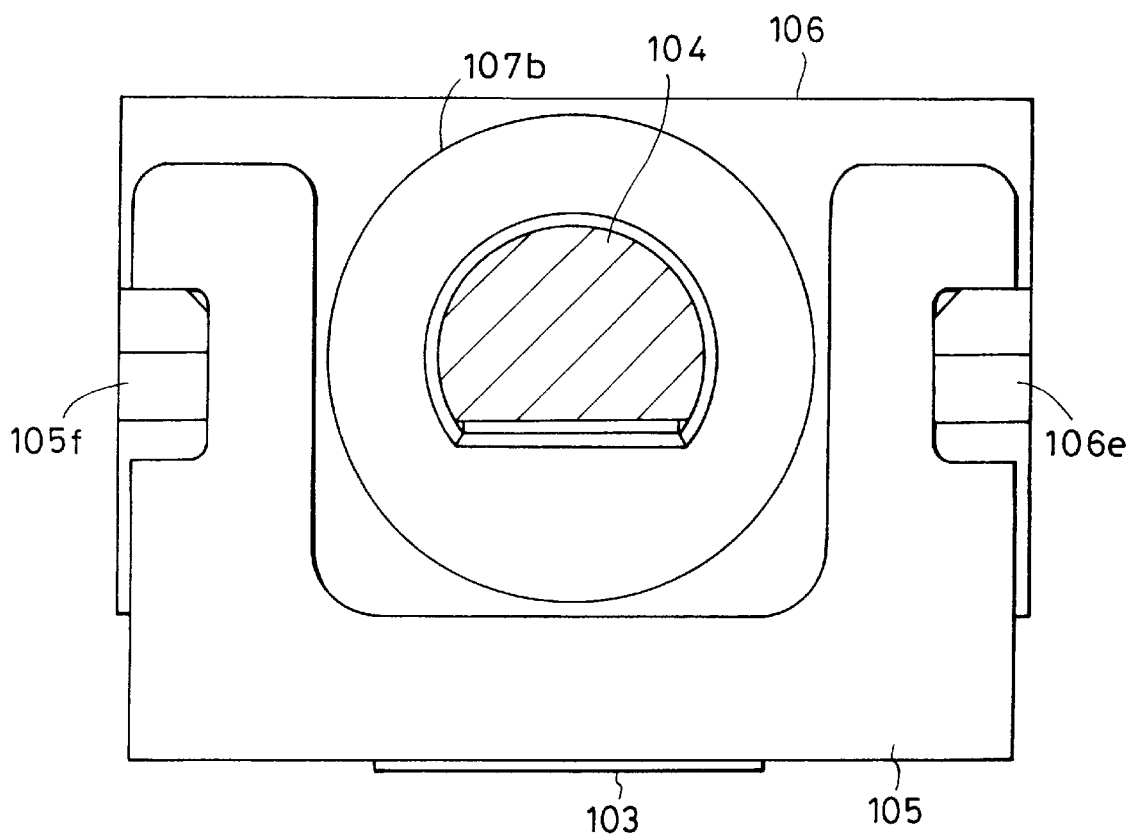
FIG. 16 is a side view showing the vibration wave motor.

When the engagement portions 105c, 105d, 105e, and 105f of the pressure spring 105 are engaged with the engagement projections 106c, 106d, 106e, and 106f of the case 106, respectively, as shown in FIG. 15 in detail, the pressure spring 105 is engaged with the case 106. The lower portions of the engagement projections 106c to 106f are tapered, so that the engagement portions 105c to 105f can be easily engaged with the engagement projections 106c to 106f from the lower side. Since the vertical length of the engagement portions 105c to 105f is larger than that of the engagement projections 106c to 106f, vertical movement of the pressure spring 105 with respect to the case 106 is allowed.

Assembly procedures of the vibration wave motor will be briefly described below.

Figure 17:
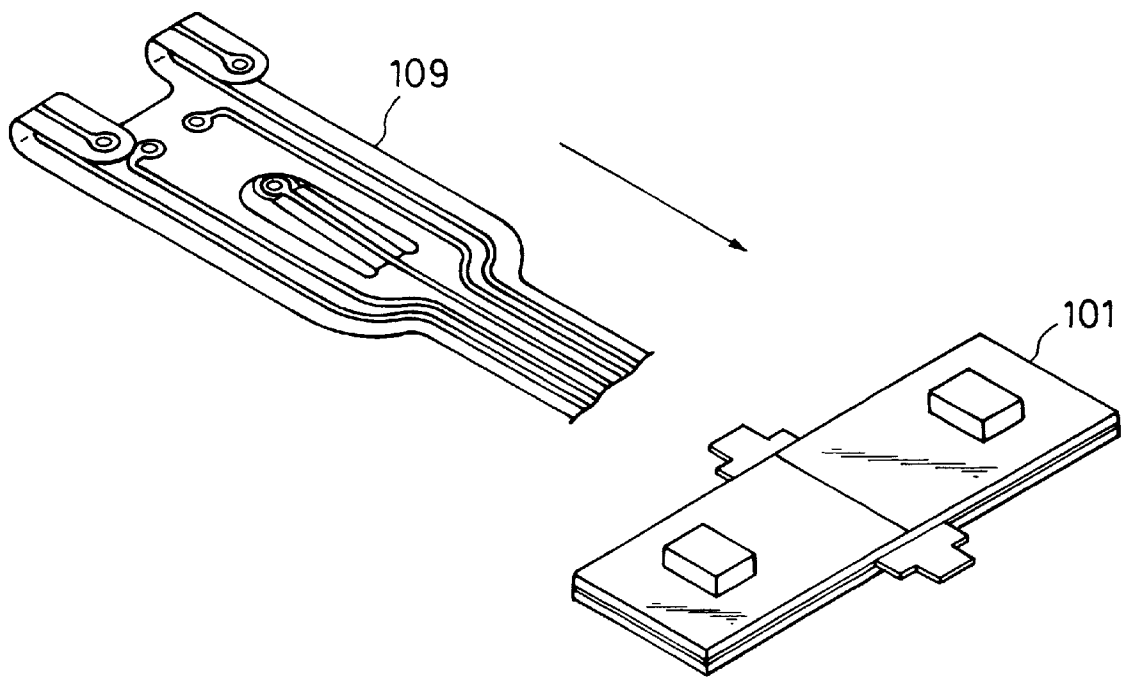
FIG. 17 is a perspective view showing the vibration member and a flexible printed board connected to the vibration member.
Figure 18:
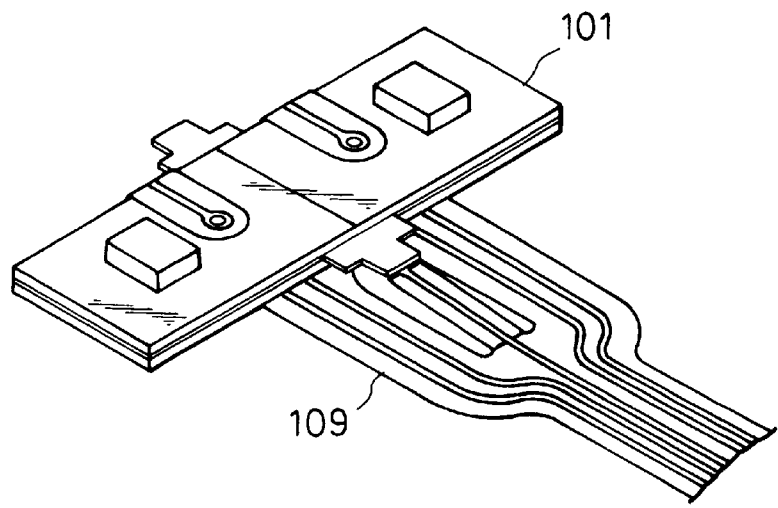
FIG. 18 is a perspective view showing the vibration member and the flexible printed board connected to the vibration member.

[Procedure 1] As shown in FIG. 17, a voltage applying flexible printed board 109 is mounted on the vibration member 101. FIG. 18 shows the mounting state.

Figure 19:
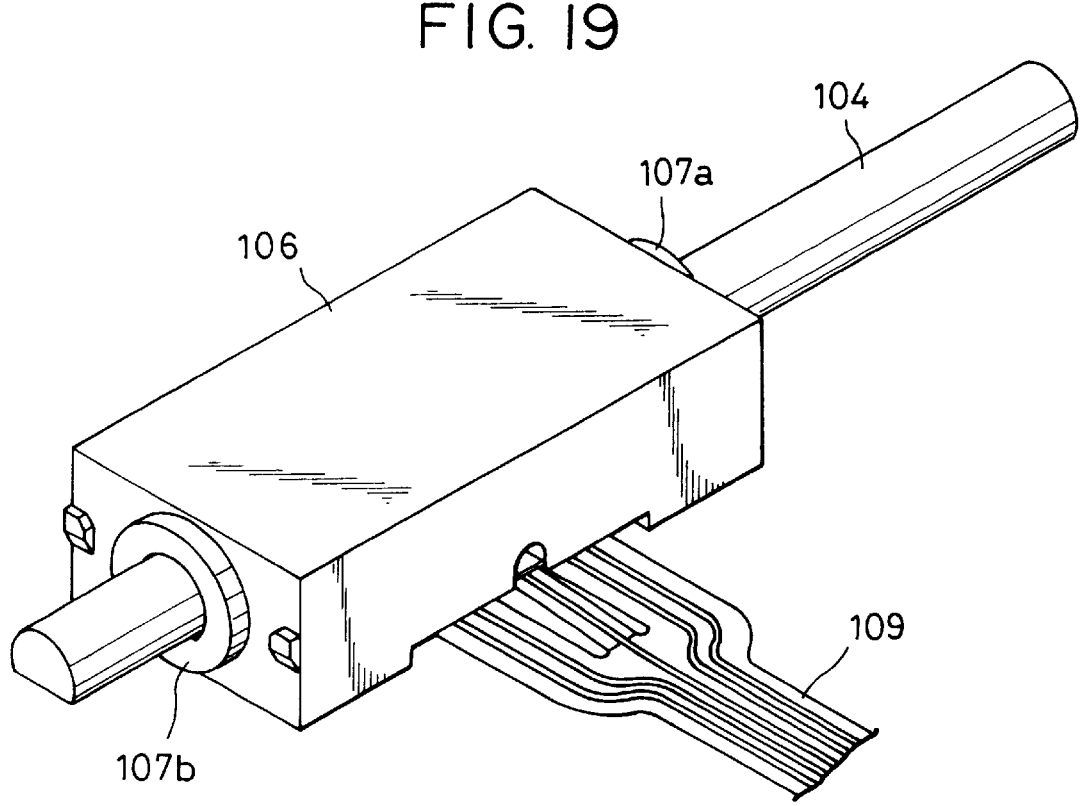
FIG. 19 is a perspective view showing the coupling relationship between the vibration wave motor and the flexible printed board.

[Procedure 2] As shown in FIG. 19, the guide members 107a and 107b are integrated with the case 106 in advance, and the mobile member 104 is inserted into the case 106 and the guide members 107a and 107b. In this structure, the projection portions 101m and 101n of the vibration member 101 with the voltage applying flexible printed board 109 prepared in Procedure 1 are fitted in the guide portions 106a and 106b of the case 106.

Figure 20:
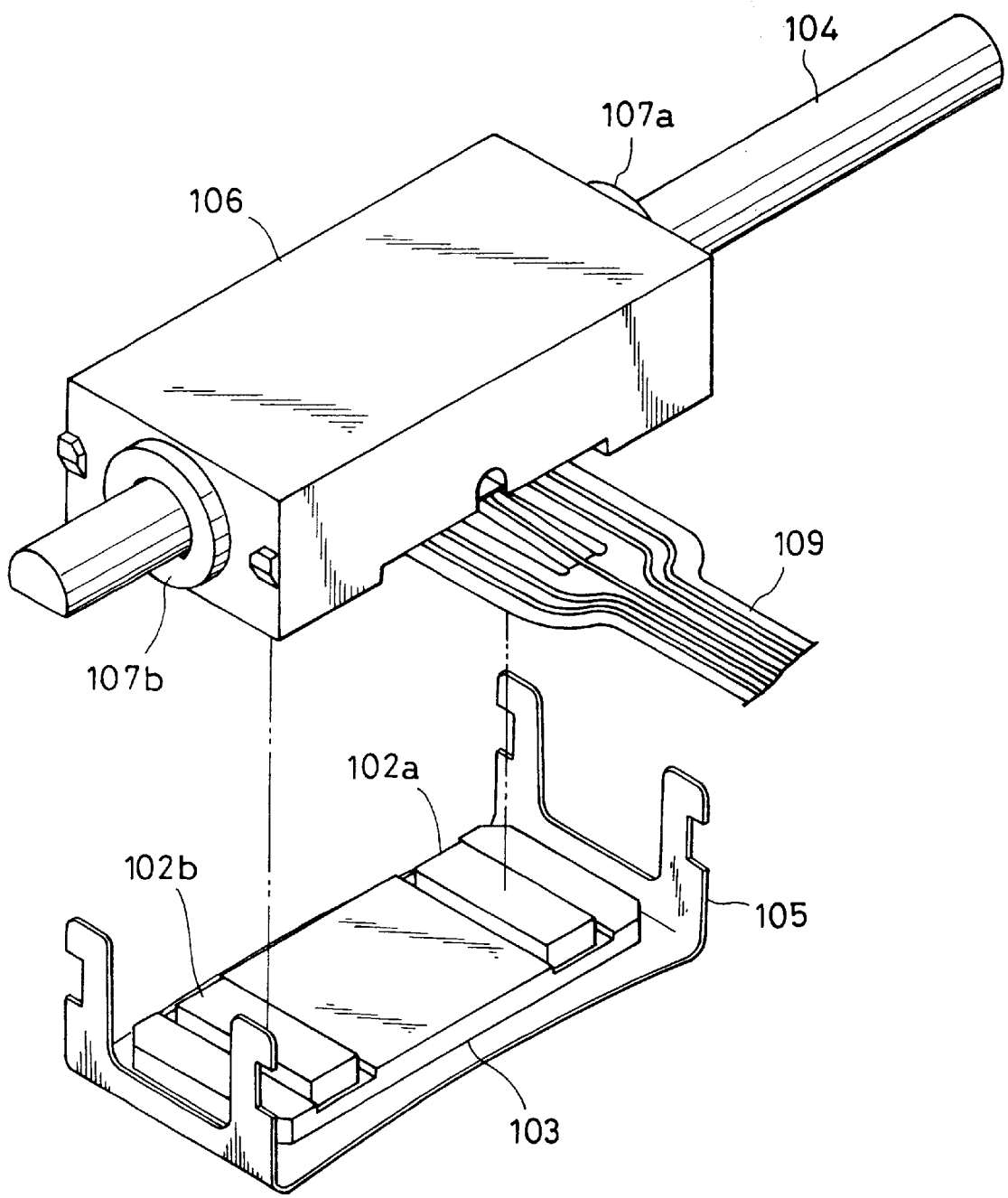
FIG. 20 is a perspective view showing the coupling relationship between the case member and the pressure spring.
Figure 21:
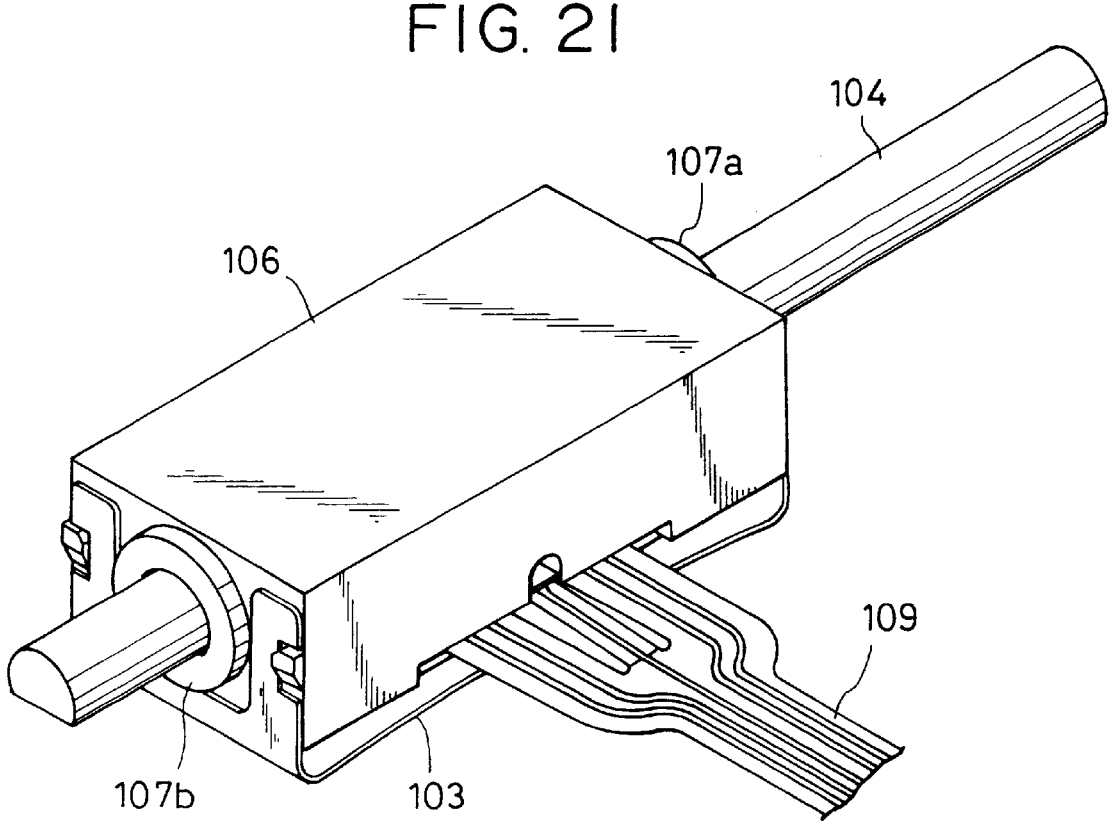
FIG. 21 is a perspective view showing an assembly state of the vibration wave motor.

[Procedure 3] As shown in FIG. 20, the elastic members 102a and 102b are adhered to the support member 103 with a pressure sensitive adhesive double coated tape or the like in advance, and the projection portion 103a of the support member 103 is fitted in the hole 105a of the pressure spring 105 to be matched and integrated with each other. The resultant structure is incorporated in the case 106 in which the vibration member 101 prepared in Procedure 2 is incorporated. In this case, as described above, the engagement portions 105c, 105d, 105e, and 105f of the pressure spring 105 are engaged with the engagement projections 106c, 106d, 106e, and 106f of the case 106, respectively. In this manner, the vibration member 101 is stored in the case 106 through the opening portion in the lower surface of the case 106. FIG. 21 shows the engagement state.

Figure 22:
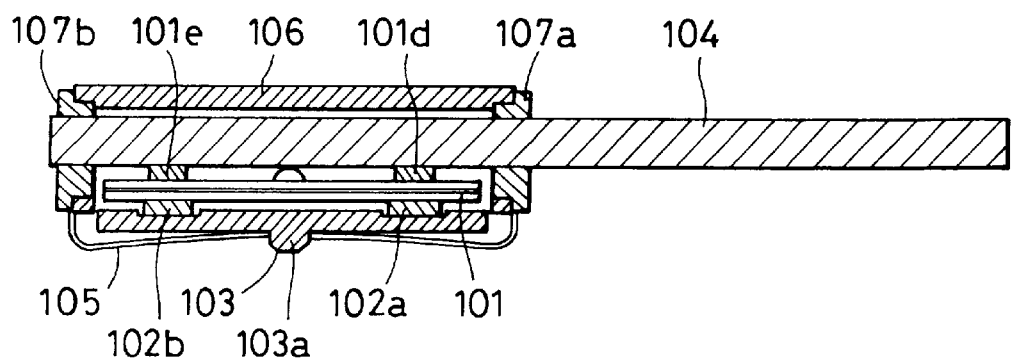
FIG. 22 is a sectional view showing an assembly state of the vibration wave motor.

FIG. 22 is a sectional view showing a vibration wave motor assembled as described above. As is apparent from FIG. 22, the pressing force of the pressure spring 105 acts on the vibration member 101 through the elastic members 102a and 102b to bring the vibration member 101 into contact with the mobile member 104 in a pressure state.

In this case, the vibration member 101 can be stabilized to cause the vibration member 101 to be supported by the support member 103. Since the support member 103 is held by the pressure spring 105, a smaller number of parts and an easier assembling operation than those in a case wherein a member for holding the support member 103 is arranged independently of the pressure spring. In the above embodiment, the mobile member 104 having a D-shaped section is used. However, the present invention is not limited to the embodiment, and a mobile member having a planar shape or a triangle section may be used.

A method of driving the vibration wave motor will be described below. While the electrode films 101e and 101h (A-phase electrode films) and the electrode films 101f and 101i (B-phase electrode films) of the vibration member 101 are rendered conductive, voltages having specific frequencies whose phases are different from each other by 90° are applied to the A-phase electrode film 101e and the B-phase electrode film 101f through the voltage applying flexible printed board 109. In this case, the piezoelectric element 101a repeats extraction and contraction movements whose phases are different from each other by 90° at portions corresponding to the electrode films. As a result, a longitudinal vibration and a bending vibration are excited in the elastic member 101a, so that the movement extraction members 101d and 101e elliptically move in the same direction. This elliptic movement drives the mobile member 104 by abrasion between the movement extraction members 101d and 101e and-the mobile member 104 in the direction indicated by an arrow in FIG. 11, for example.

(Fourth Embodiment)

Figure 23:
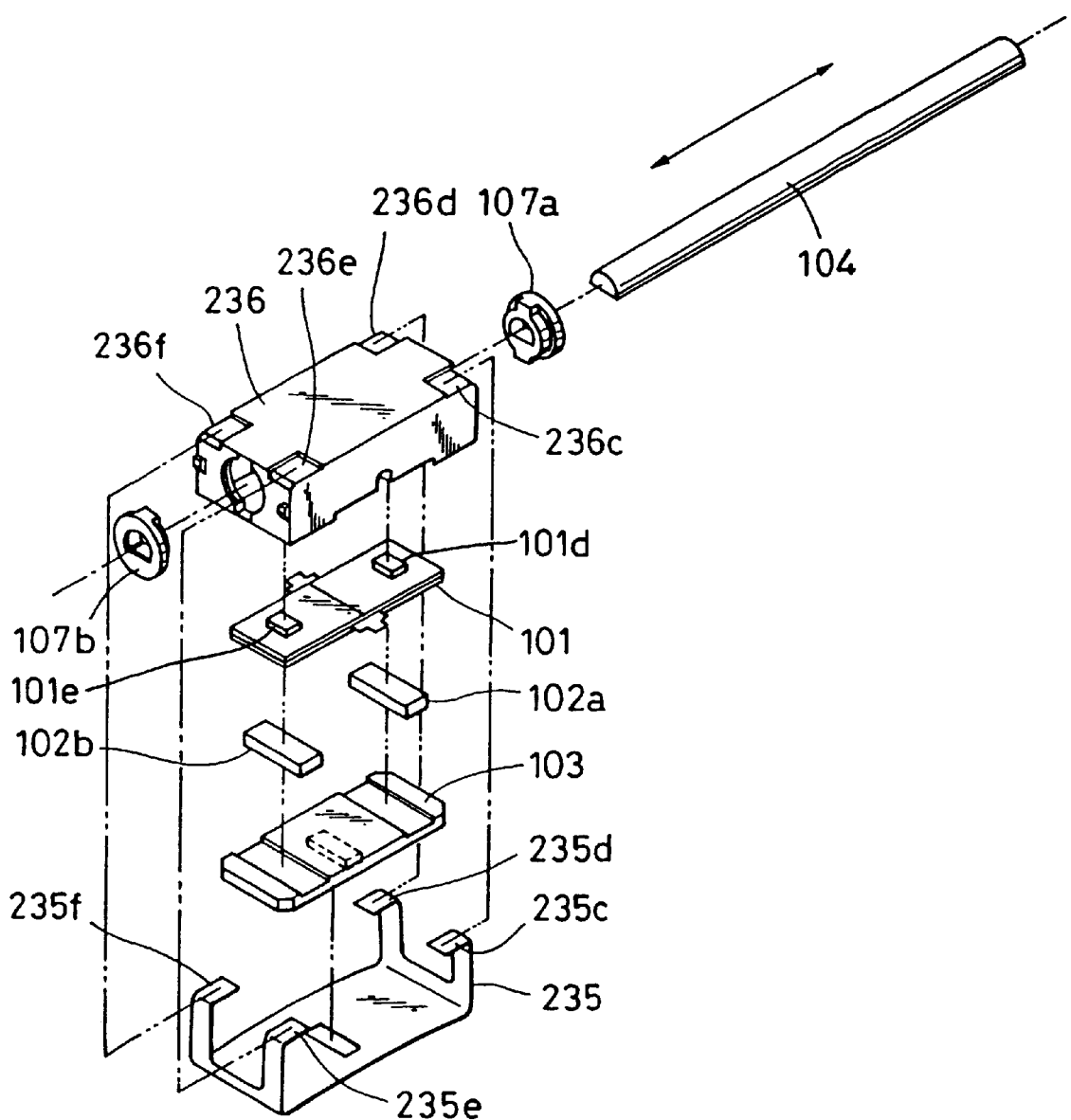
FIG. 23 is an exploded perspective view showing a vibration wave motor according to the fourth embodiment of the present invention.

A vibration wave motor (vibration device) according to the fourth embodiment of the present invention will be described below. FIG. 23 is an exploded perspective view showing the vibration wave motor. The same reference numerals as in the third embodiment denote the same parts in the fourth embodiment, and a description thereof will be omitted.

Referring to FIG. 23, reference numeral 235 denotes a pressure spring for bringing a mobile member 104 into contact with movement extraction members 101d and 101e of a vibration member 101. Reference numeral 236 denotes a case for storing the vibration member 101.

In the third embodiment, the pressure spring 105 is engaged on the side surface of the case 106. However, in the fourth embodiment, the upper ends of the engagement arm of the pressure spring 235 are bent inward in the horizontal direction, and the bent portions 235c to 235f are engaged with engagement portions 236c to 236f arranged on the upper end face of the case 236, respectively, so that the pressure spring 235 is attached to the case 236.

(Fifth Embodiment)

Figure 24:
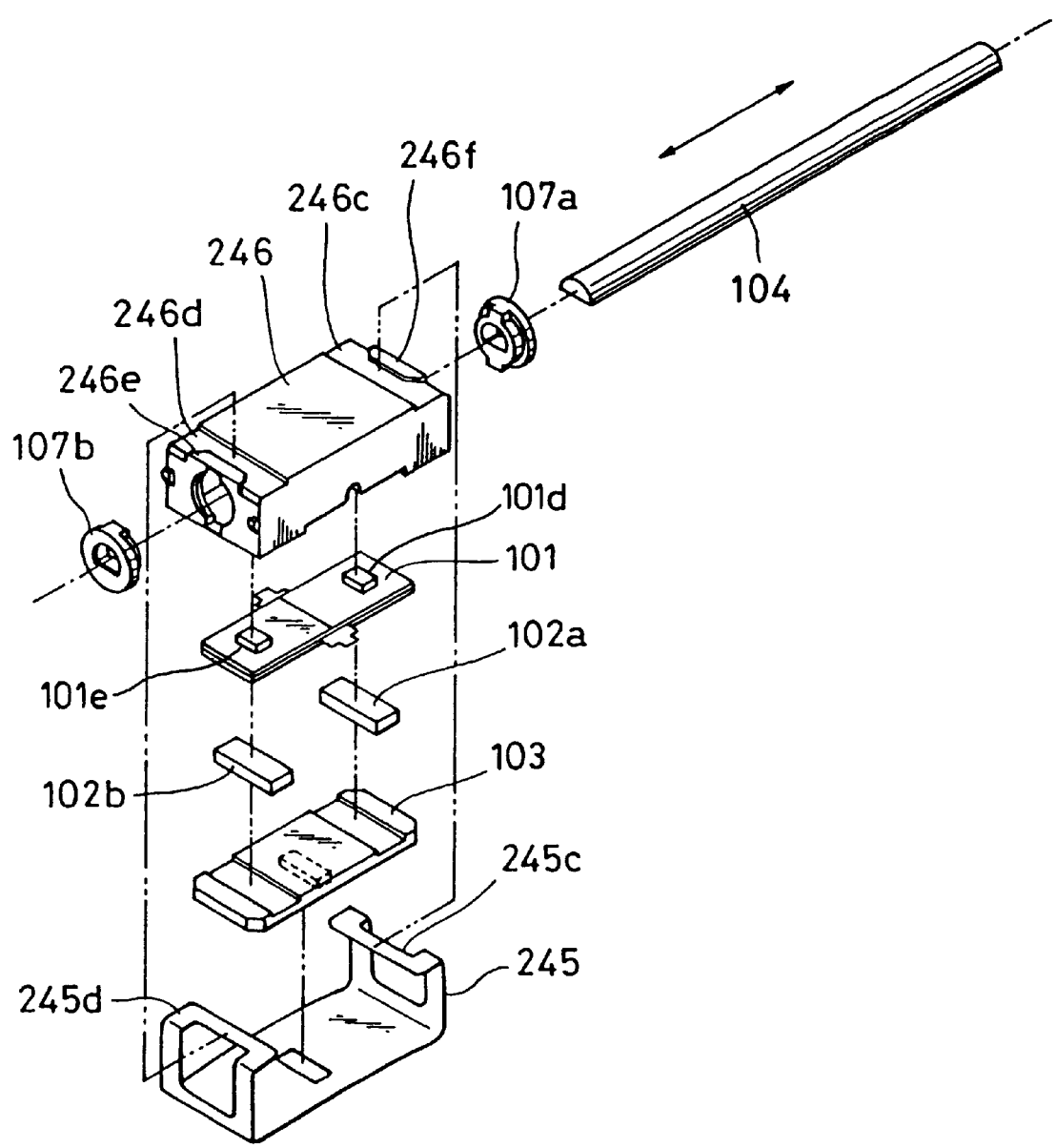
FIG. 24 is an exploded perspective view showing a vibration wave motor according to the fifth embodiment of the present invention.

A vibration wave motor (vibration device) according to the fifth embodiment of the present invention will be described below. FIG. 24 is an exploded perspective view showing the vibration wave motor. The same reference numerals as in the third and fourth embodiments denote the same parts in the fifth embodiment, and a description thereof will be omitted.

Referring to FIG. 24, reference numeral 245 denotes a pressure spring for bringing a mobile member 104 into contact with movement extraction members 101d and 101e of a vibration member 101. Reference numeral 246 denotes a case for storing the vibration member 101. In the fourth embodiment, the engagement arms on both the sides of the pressure spring 235 in the width direction are independently formed, and the upper portions of the arms are only bent. However, in the fifth embodiment, the upper portions of the engagement arms of the pressure spring 245 are connected to the case 246, and connection portions of the engagement arms are captured by projections 246e and 246f formed on engagement portions 246c and 246d formed on the upper end face of the case 246. In this manner, the engagement arms of the pressure spring 245 can be prevented from being disconnected from the engagement portions 246c and 246d of the case 246.

(Sixth Embodiment)

Figure 25:
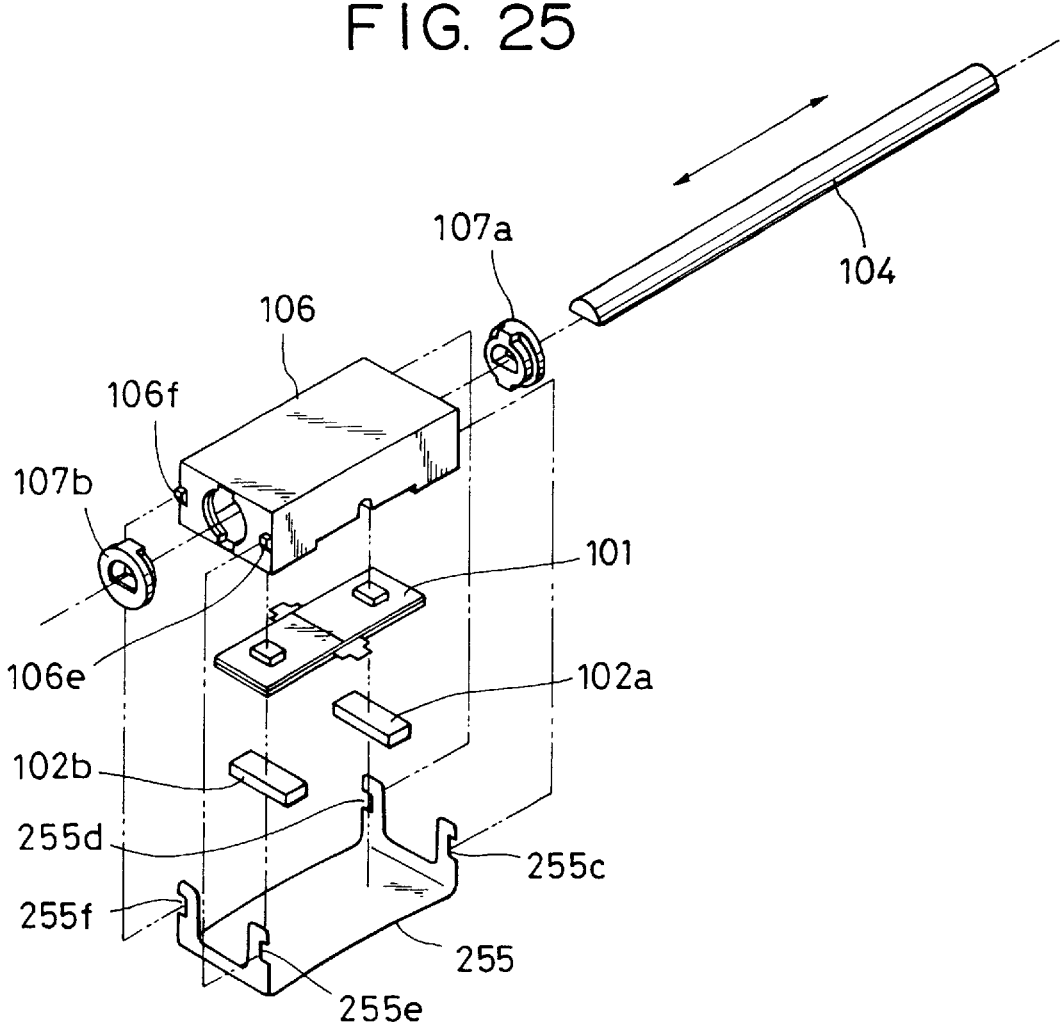
FIG. 25 is an exploded perspective view showing a vibration wave motor according to the sixth embodiment of the present invention.

A vibration wave motor (vibration device) according to the sixth embodiment of the present invention will be described below. FIG. 25 is an exploded perspective view showing the vibration wave motor. The same reference numerals as in the third to fifth embodiments denote the same parts in the sixth embodiment, and a description thereof will be omitted.

In the third to fifth embodiments, the support member 103 and the elastic members 102a and 102b are interposed between the vibration member 101 and the pressure springs 105, 235, and 245. In this embodiment, the support member 103 is omitted, only the elastic members 102a and 102b are interposed between the vibration member 101 and the elastic.

In this case, the elastic members 102a and 102b may be adhered to the vibration member 101 or a pressure spring 255 with a pressure sensitive adhesive double coated tape in advance. In this embodiment, since the pressure spring 255 also serves as the power supply member 13, the number of parts and the number of assembly steps can be reduced compared with the third to fifth embodiments.

(Seventh Embodiment)

Figure 26:
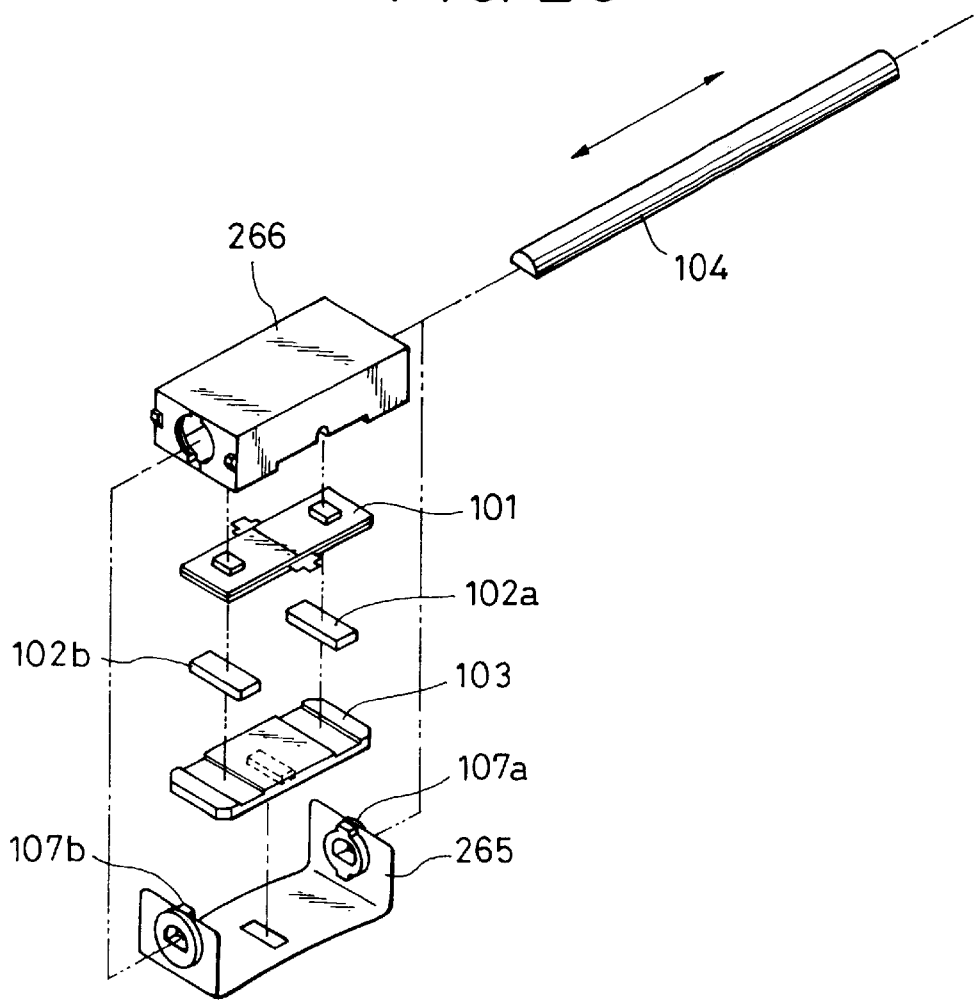
FIG. 26 is an exploded perspective view showing a vibration wave motor according to the seventh embodiment of the present invention.
Figure 27:
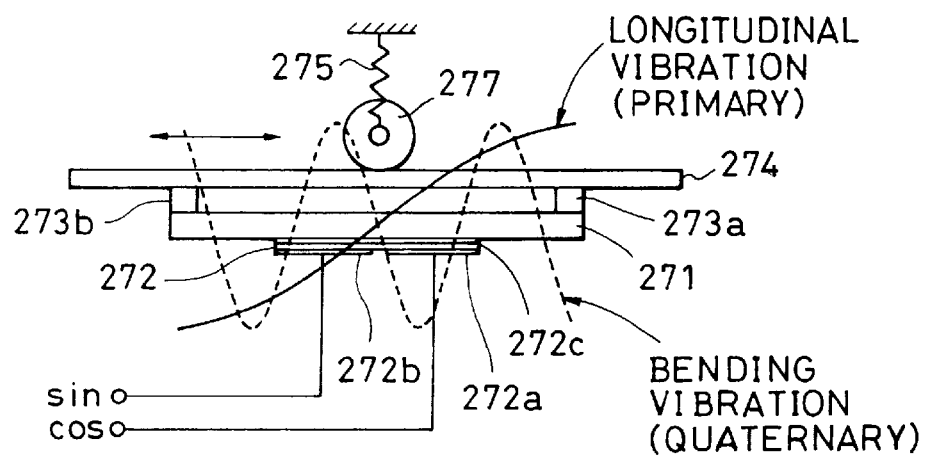
FIG. 27 is a view for explaining an operation principle of a vibration wave motor.
Figure 28A:
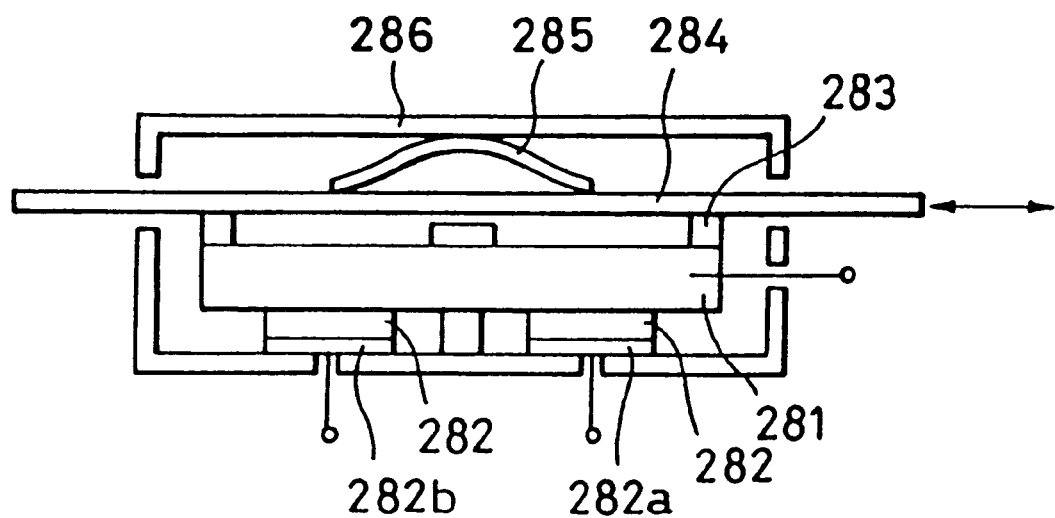
FIGS. 28(a) and (b) are sectional views showing arrangements of conventional vibration wave motors.
Figure 28B:
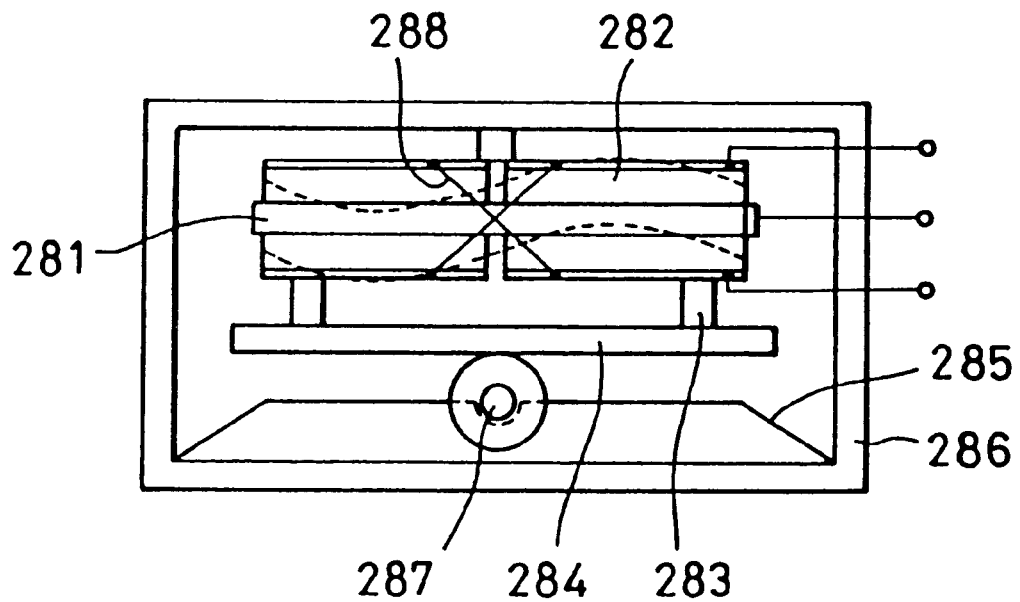

A vibration wave motor (vibration device) according to the seventh embodiment of the present invention will be described below. FIG. 26 is an exploded perspective view showing the vibration wave motor. The same reference numerals as in the third to sixth embodiments denote the same parts in the seventh embodiment, and a description thereof will be omitted.

In the third to sixth embodiments, the pressure springs 105, 235, and 255 and the cases 106, 236, and 246 are engaged with each other, respectively. In this embodiment, guide members 107a and 107b are attached to a pressure spring 265, so that the pressure spring 265 can also be attached to the case 266. In this case, the guide members 107a and 107b require the same positioning portion as in the third embodiment to prevent the guide members 107a and 107b from being shifted relative to each other.

In the vibration wave motor described above, a relatively large amount of deformation of the pressure spring can be allowed without increasing the size of case member. For this reason, the spring constant of the pressure spring can be decreased to some extent, and the pressure can be prevented from being changed depending on a small change in the amount of spring deformation.

In the present invention, the above embodiment, the modification, and technical elements thereof may be combined with each other as needed.

As described above, in the above embodiment,-an urging member is attached to the outside the case member, so that a space for storing the urging member need not be provided inside the case member. For this reason, since the space can be omitted, the case member can be decreased in size. In addition, since it is satisfactory that the urging member is only arranged outside the case member, the structure and assembling operation of the unit can be simplified. Since a relatively large amount of spring deformation can be allowed, a spring constant is decreased to suppress the pressure from varying, and appropriate pressing force can be easily set.

When the vibration member is pressed by the urging member in the contact direction between the vibration member and the contact member, and a support member is interposed between the urging member and the vibration member, the vibration member can be stably supported. In this case, when the support member is held by the urging member, the urging member can have a function of generating pressing force and a function of holding the support member. The number of parts can be reduced, and the assembly can be made more easy.

What is claimed is:

1. A vibration device comprising:
   a vibration member that generates a vibration therein in response to a driving electric signal applied to said vibration member;
   a contact member contactable with said vibration member, said contact member being movable relative to said vibration member by vibration generated in said vibration member; and
   a signal supply member that supports said vibration member and supplies a driving electric signal to said vibration member, said signal supply member comprising first and second cantilevered terminal contact portions, each of which sandwiches said vibration member at a supporting position of said vibration member such that said vibration member is elastically deformable by vibration generated in said vibration member.

2. A vibration device according to claim 1, wherein each portion of the signal supply member sandwiches said vibration member at a position near a node position of a vibration generated in said vibration member.

3. A vibration device according to claim 1, wherein said vibration member comprises an electro-mechanical energy conversion element connected to an elastic member, and said signal supply member supplies the driving electric signal to said conversion element.

4. A vibration device according to claim 1, wherein each portion of said signal supply member that sandwiches said vibration member comprises a plurality of contact portions.

5. A vibration device according to claim 1, wherein said signal supply member also provides a contact pressure between said vibration member and said contact member.

6. A vibration device according to claim 5, wherein said signal supply member is contactable with said vibration member so as to generate said contact pressure between said vibration member and said contact member near a node position of a vibration generated in said vibration member.

7. A vibration device according to claim 5, wherein said signal supply member provides said contact pressure to said vibration member at a plurality of positions, and said signal supply member is contactable with said vibration member so as to generate said contact pressure between said vibration member and said contact member at positions which are symmetrical with respect to a central portion of said vibration member.

8. A vibration device according to claim 1, wherein at least said vibration member and said signal supply member are stored in a case.

9. A vibration device according to claim 8, wherein at least said signal supply member is supported by said case.

10. A vibration device according to claim 2, wherein said signal supply member sandwiches said vibration member at a position near a common node position of a longitudinal vibration and a bending vibration of said vibration member.

11. A vibration device according to claim 6, wherein said signal supply member is contactable with said vibration member so as to generate said contact pressure between said vibration member and said contact member at a position near a common node position of a longitudinal vibration and a bending vibration of said vibration member.

12. A vibration device according to claim 10, wherein the portion of said signal supply member that sandwiches said vibration member comprises a plurality of contact portions.

13. A vibration device according to claim 11, wherein said signal supply member provides said contact pressure to said vibration member at a plurality of positions, and said signal supply member is contactable with said vibration member so as to generate said contact pressure between said vibration member and said contact member at positions which are symmetrical with respect to a central portion of said vibration member.

14. A vibration device comprising:

a case having an open side, first and second openings respectively located at opposite ends of said case, and an engaging portion disposed on an exterior portion of said case;

a vibration member disposed in said case, said vibration member generating a vibration;

a contact member inserted though the first and second openings of said case and supported relative to said case thereby, said contact member thereby being arranged in contact with said vibration member and linearly movable relative to said vibration member by vibration generated in said vibration member; and an urging member extended across the open side of said case and including a hook engaged with said engaging portion of said case, so that said urging member urges said vibration member and said contact member into pressure contact with each other at a location within said case.

15. A vibration device according to claim 14, wherein the open side of said case opposes said vibration member, and said urging member presses said vibration member in a direction to contact said vibration member to said contact member.

16. A vibration device according to claim 15, wherein an elastic member is interposed between said urging member and said vibration member.

17. A vibration device according to claim 15, wherein a support member for supporting said vibration member is interposed between said urging member and said vibration member.

18. A vibration device according to claim 17, wherein said support member is held by said urging member.

19. A vibration device according to claim 14, wherein movement of said contact member is guided by said case.

20. A vibration device comprising:

a vibration member that generates a vibration therein in response to a driving electric signal applied to said vibration member;

a contact member contactable with said vibration member, said contact member being movable relative to said vibration member by vibration generated in said vibration member; and a signal supply member, composed of a conductive material, that supports said vibration member and supplies a driving electric signal to said vibration member, said signal supply member comprising first and second portions that sandwich said vibration member at supporting positions of said vibration member such that said vibration member is elastically deformable by vibration generated in said vibration member.

21. A vibration device comprising:

a vibration member that generates a vibration therein in response to a driving electric signal applied to said vibration member;

a contact member contactable with said vibration member, said contact member being movable relative to said vibration member by vibration generated in said vibration member; and a pair of opposing signal supply members that support said vibration member and supply respective driving electric signals to said vibration member, each signal supply member comprising a portion that sandwiches said vibration member at a supporting position of said vibration member such that said vibration member is elastically deformable by vibration generated in said vibration member.

* * * * *

UNITED STATES PATENT AND TRADEMARK OFFICE
CERTIFICATE OF CORRECTION

PATENT NO. : 6,218,767 B1
DATED : April 17, 2001
INVENTOR(S) : Hiroshi Akada et al.

It is certified that error appears in the above-identified patent and that said Letters Patent is hereby corrected as shown below:

Title page,
Item [57], ABSTRACT,
Line 7, "deformed" should read -- deformed and --.

Column 1,
Line 20, "m" should be deleted.
Line 21, "ember" should read -- member --.
Line 35, "for" (second occurrence) should read -- of --.

Column 4,
Line 18, "consisting" should read -- each consist --.
Line 54, "1c-i" should read -- 1c-1 --.

Column 8,
Line 12, "by" should be deleted.

Column 13,
Line 66, "elas-" should read -- pressure spring 255. --.
Line 67, "tic." should be deleted.

Column 14,
Line 34, "-an" should read -- an --.
Line 35, "outside" should read -- outside of --.

Signed and Sealed this

Twenty-second Day of January, 2002

Attest:

*Attesting Officer*

JAMES E. ROGAN
*Director of the United States Patent and Trademark Office*